US011601775B2

(12) United States Patent
Lee et al.

(10) Patent No.: US 11,601,775 B2
(45) Date of Patent: *Mar. 7, 2023

(54) METHOD FOR GENERATING A CUSTOMIZED/PERSONALIZED HEAD RELATED TRANSFER FUNCTION

(71) Applicant: Creative Technology Ltd, Singapore (SG)

(72) Inventors: Teck Chee Lee, Singapore (SG); Desmond Hii, Singapore (SG)

(73) Assignee: CREATIVE TECHNOLOGY LTD, Singapore (SG)

( * ) Notice: Subject to any disclaimer, the term of this patent is extended or adjusted under 35 U.S.C. 154(b) by 50 days.

This patent is subject to a terminal disclaimer.

(21) Appl. No.: 17/037,232

(22) Filed: Sep. 29, 2020

(65) Prior Publication Data

US 2021/0014629 A1    Jan. 14, 2021

Related U.S. Application Data

(63) Continuation of application No. 16/029,509, filed on Jul. 6, 2018, now Pat. No. 10,805,757, which is a
(Continued)

(30) Foreign Application Priority Data

Dec. 31, 2015  (SG) ........................... 10201510822Y
Jan. 5, 2018   (SG) ........................... 10201800147X

(51) Int. Cl.
*H04S 7/00*   (2006.01)
*G06T 3/40*   (2006.01)
(Continued)

(52) U.S. Cl.
CPC ............ *H04S 7/303* (2013.01); *G06T 3/4007* (2013.01); *G06T 7/149* (2017.01); *G06T 7/337* (2017.01);
(Continued)

(58) Field of Classification Search
None
See application file for complete search history.

(56) References Cited

U.S. PATENT DOCUMENTS 5,748,758 A   5/1998  Menasco, Jr. et al.
7,555,354 B2  6/2009  Walsh et al.
(Continued)

FOREIGN PATENT DOCUMENTS

CN   101847268 A   9/2010
FR      3051951 B1   6/2018
(Continued)

OTHER PUBLICATIONS

Meshram et al., "P-HRTF: Efficient Personalized HRTF Computation for High-Fidelity Spatial Sound," 2014 IEEE International Symposium on Mixed and Augmented Reality (ISMAR), 2014, pp. 53-61, Munich, Germany.
(Continued)

*Primary Examiner* — Leon Viet Q Nguyen
(74) *Attorney, Agent, or Firm* — Snell & Wilmer L.L.P.

(57) ABSTRACT

A method is provided for generating a personalized Head Related Transfer Function (HRTF). The method can include capturing an image of an ear using a portable device, auto-scaling the captured image to determine physical geometries of the ear and obtaining a personalized HRTF based on the determined physical geometries of the ear. In addition, a system and a method in association with the system are also provided for customizing audio experience. Customization of audio experience can be based on derivation of at least one customized audio response characteristic which can be applied to an audio device used by a person. Finally, methods and systems are provided for rendering audio over headphones with head tracking enabled by, for example, exploiting efficiencies in creating databases and filters for use in filtering 3D audio sources for more realistic
(Continued)

audio rendering and also allowing greater head movement to enhance the spatial audio perception.

15 Claims, 11 Drawing Sheets

Related U.S. Application Data continuation-in-part of application No. 16/062,521, filed on Jun. 14, 2018, now abandoned, and a continuation-in-part of application No. 15/969,767, filed as application No. PCT/SG2016/050621 on Dec. 28, 2016, now Pat. No. 10,225,682.

(60) Provisional application No. 62/614,482, filed on Jan. 7, 2018.

(51) Int. Cl.
*G06T 7/62* (2017.01)
*H04R 5/04* (2006.01)
*H04R 3/00* (2006.01)
*G06T 7/149* (2017.01)
*G06T 7/60* (2017.01)
*G06T 7/33* (2017.01)

(52) U.S. Cl.
CPC ............ *G06T 7/60* (2013.01); *G06T 7/62* (2017.01); *H04R 3/00* (2013.01); *H04R 5/04* (2013.01); *G06T 2207/20081* (2013.01); *G06T 2207/30196* (2013.01); *H04S 2420/01* (2013.01)

(56) References Cited

U.S. PATENT DOCUMENTS

| | | | |
|---|---|---|---|
| 7,840,019 | B2 | 11/2010 | Slaney et al. |
| 7,936,887 | B2 | 5/2011 | Smyth |
| 9,030,545 | B2 | 5/2015 | Pedersen |
| 9,544,706 | B1 | 1/2017 | Hirst |
| 9,584,946 | B1 | 2/2017 | Lyren et al. |
| 9,602,947 | B2 | 3/2017 | Oh et al. |
| 10,225,682 | B1 | 3/2019 | Lee et al. |
| 10,805,757 | B2 * | 10/2020 | Lee ............ G06T 3/4007 |
| 2003/0007648 | A1 | 1/2003 | Currell |
| 2007/0270988 | A1 | 11/2007 | Goldstein et al. |
| 2008/0170703 | A1 | 7/2008 | Zivney |
| 2012/0008806 | A1 | 1/2012 | Hess |
| 2012/0183161 | A1 | 7/2012 | Agevik et al. |
| 2013/0169779 | A1* | 7/2013 | Pedersen ............ G06V 40/10 348/E7.085 |
| 2015/0073262 | A1 | 3/2015 | Roth et al. |
| 2015/0124975 | A1 | 5/2015 | Pontoppidan |
| 2015/0223002 | A1 | 8/2015 | Mehta et al. |
| 2015/0312694 | A1 | 10/2015 | Bilinski et al. |
| 2015/0373477 | A1 | 12/2015 | Norris et al. |
| 2015/0382127 | A1 | 12/2015 | Sun et al. |
| 2016/0379041 | A1 | 12/2016 | Rhee et al. |
| 2017/0048641 | A1 | 2/2017 | Franck |
| 2017/0223478 | A1 | 8/2017 | Jot et al. |
| 2018/0077514 | A1 | 3/2018 | Lee et al. |
| 2018/0091920 | A1 | 3/2018 | Family |
| 2018/0218507 | A1* | 8/2018 | Hyllus ............ G06V 20/653 |
| 2018/0249279 | A1 | 8/2018 | Karapetyan et al. |
| 2018/0373957 | A1 | 12/2018 | Lee et al. |
| 2019/0014431 | A1 | 1/2019 | Lee et al. |
| 2020/0137508 | A1 | 4/2020 | Lee et al. |

FOREIGN PATENT DOCUMENTS

| | | |
|---|---|---|
| WO | 2017041922 A1 | 3/2017 |
| WO | 2017116308 A1 | 7/2017 |
| WO | 2017/202634 A1 | 11/2017 |

OTHER PUBLICATIONS

Dalena, Marco. "Selection of Head-Related Transfer Function through Ear Contour Matching for Personalized Binaural Rendering," Politecnico Di Milano Master thesis for Master of Science in Computer Engineering, 2013, Milano, Italy.

Cootes et al., "Active Shape Models—Their Training and Application," Computer Vision And Image Understanding, Jan. 1995, pp. 38-59, vol. 61, No. 1, Manchester, England.

John C. Middlebrooks, "Virtual localization improved by scaling nonindividualized external-ear transfer functions in frequency," Journal of the Acoustical Society of America, Sep. 1999, pp. 1493-1510, vol. 106, No. 3, Pt. 1, USA.

Yukio Iwaya, "Individualization of head-related transfer functions with tournament-style listening test: Listening with other's ears," Acoustical Science and Technology, 2006, vol. 27, Issue 6, Japan.

Slim Ghorbal, Theo Auclair, Catherine Soladie, & Renaud Seguier, "Pinna Morphological Parameters Influencing HRTF Sets," Proceedings of the 20th International Conference on Digital Audio Effects (DAFx-17), Sep. 5-9, 2017, Edinburgh, UK.

Slim Ghorbal, Renaud Seguier, & Xavier Bonjour, "Process of HRTF individualization by 3D statistical ear model," Audio Engineering Society's 141st Convention e-Brief 283, Sep. 29, 2016-Oct. 2, 2016, Los Angeles, CA.

Robert P. Tame, Daniele Barchiesi, & Anssi Klapuri, "Headphone Virtualisation: Improved Localisation and Extemalisation of Non-individualised HRTFs by Cluster Analysis," Audio Engineering Society's 133rd Convention Paper, Oct. 26-29, 2012, San Francisco, CA.

Zotkin, Dmitry et al., HRTF Personalization Using Anthropometric Measurements, 2003 IEEE Workshop on Applications of Signal Processing to Audio and Acouistics, Oct. 19-22, 2003, p. 157-160, New Paltz, NY.

Karapetyan et al., Elevation Control in Binaural Rendering, Jun. 4-7, 2016, pp. 1-4, Audio Engineering Society, 140th Convention e-Brief 270, Paris, France.

* cited by examiner

METHOD FOR GENERATING A CUSTOMIZED/PERSONALIZED HEAD RELATED TRANSFER FUNCTION

CROSS-REFERENCE TO RELATED APPLICATIONS

This application is a continuation of U.S. patent application Ser. No. 16/029,509, filed 6 Jul. 2018 and entitled "METHOD FOR GENERATING A CUSTOMIZED/PERSONALIZED HEAD RELATED TRANSFER FUNCTION", which is a continuation-in-part of U.S. patent application Ser. No. 16/062,521, filed 14 Jun. 2018 and entitled "METHOD FOR GENERATING A CUSTOMIZED/PERSONALIZED HEAD RELATED TRANSFER FUNCTION", which is a National Stage (§ 371) of International Application No. PCT/SG2016/050621, filed 28 Dec. 2016 and entitled "A METHOD FOR GENERATING A CUSTOMIZED/PERSONALIZED HEAD RELATED TRANSFER FUNCTION", which claims the benefit of priority from Singapore Patent Application No. 10201510822Y, filed 31 Dec. 2015 and entitled "A METHOD FOR GENERATING A CUSTOMIZED/PERSONALIZED HEAD RELATED TRANSFER FUNCTION", the entirety of which are incorporated by reference for all purposes.

U.S. patent application Ser. No. 16/029,509, filed 6 Jul. 2018 and entitled "METHOD FOR GENERATING A CUSTOMIZED/PERSONALIZED HEAD RELATED TRANSFER FUNCTION", is also a continuation-in-part of U.S. patent application Ser. No. 15/969,767, U.S. Pat. No. 10,225,682, filed 2 May 2018 and issued on 5 Mar. 2019, and entitled "SYSTEM AND A PROCESSING METHOD FOR CUSTOMIZING AUDIO EXPERIENCE", which claims the benefit of priority from Singapore Patent Application No. 10201800147X, filed 5 Jan. 2018 and entitled "A SYSTEM AND A PROCESSING METHOD FOR CUSTOMIZING AUDIO EXPERIENCE", the entirety of which are incorporated by reference for all purposes.

U.S. patent application Ser. No. 16/029,509, filed 6 Jul. 2018 and entitled "METHOD FOR GENERATING A CUSTOMIZED/PERSONALIZED HEAD RELATED TRANSFER FUNCTION", also claims priority from U.S. Provisional Application No. 62/614,482, filed 7 Jan. 2018 and entitled "METHOD FOR GENERATING CUSTOMIZED SPATIAL AUDIO WITH HEAD TRACKING", the entirety of which are incorporated by reference for all purposes.

FIELD OF INVENTION

The present disclosure generally relates a method for generating a customized/personalized Head Related Transfer Function (HRTF) based on a captured image.

BACKGROUND

Accurate interactive 3D spatial audio rendering requires personalized head-related transfer functions (HRTFs).

Traditionally to obtain such personalized HRTFs, a user is required to sit, without moving, for about half an hour in an anechoic chamber with audio signals being emitted from different locations within the chamber. A microphone is placed in the user's ear for capturing audio signals as audibly perceived by the user. There is also need to consider factors such as chamber, audio signal source(s) and microphone responses. Such responses may be considered spurious responses and there may be a need to eliminate such spurious responses in order to obtain a Head Related Impulse Response (HRIR) which can subsequently be converted to a HRTF.

Prior art techniques have emerged to simplify the above approach. Specifically, it is desired to eliminate the need for an anechoic chamber and address issues such as the aforementioned spurious responses.

One such prior art technique is "P-HRTF: Efficient Personalized HRTF Computation for High-Fidelity Spatial Sound, Meshram et al. Proc. of IMAR 2014 (http://gamma.cs.unc.edu/HRTF/)". This prior art technique reconstructs a detailed ear model from multiple photos and perform acoustic simulation to get HRTF. A densely captured set of photos (20+ photos at recommended 15 degrees interval, using SLR Canon60D 8 MP) and significant computing power would be required.

Another such prior art technique is "Selection of Head-Related Transfer Function through Ear Contour Matching for Personalized Binaural Rendering. POLITECNICO DI MILANO. Master of Science in Computer Engineering. Dalena Marco. Academic Year 2012/2013". This prior art technique contemplates that instead of physically modeling the ear and the acoustics, it may be possible to perform image based matching using an existing database. The existing database can include a collection of images (e.g., photos) associated with corresponding HRTF(s). Given an image, generalized Hough transform can be used to find the best match (relative to the collection of images in the existing database) for the given image so as to obtain a corresponding HRTF.

However, it is appreciable that the above discussed approaches/techniques would require much resource in terms of computing power. Moreover, the above discussed approaches/techniques may not facilitate the creation of personalized HRTF(s) is a user friendly and/or efficient manner.

It is therefore desirable to provide a solution to address the foregoing problems.

SUMMARY OF THE INVENTION

In accordance with an aspect of the disclosure, there is provided a method for generating a personalized Head Related Transfer Function (HRTF). The method can include:
(1) capturing an image of an ear using a portable device;
(2) auto-scaling the captured image to determine physical geometries of the ear; and
(3) obtaining a personalized HRTF based on the determined physical geometries of the ear.

BRIEF DESCRIPTION OF THE DRAWINGS

Embodiments of the disclosure are described hereinafter with reference to the following drawings, in which.

DETAILED DESCRIPTION

The present disclosure relates to a method 100 (as will be shown in further detail with reference to FIG. 1) for creating/generating a personalized/customized Head Related Transfer Function (HRTF) from an image captured using a portable device such as a Smartphone having a camera. The present disclosure contemplates that the prior art technique concerning Hough transform is the simplest as compared the prior art technique which relates to the reconstruction of a detailed ear model from multiple photos and the traditional approach involving the use of an anechoic chamber. The present disclosure further contemplates the need to further simplify the prior art technique concerning Hough transform so as to at least facilitate the creating/generating personalized HRTF(s) in a user friendly and/or efficient manner.

Figure 1:
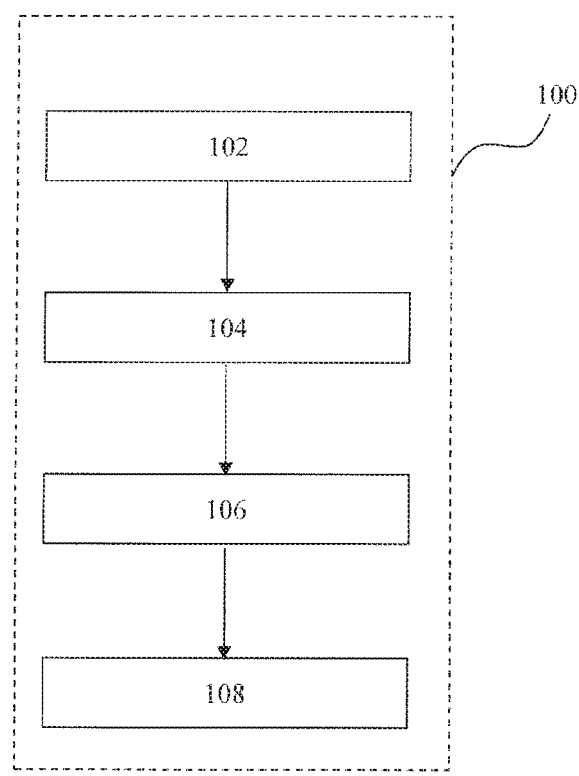
FIG. 1 shows a method for creating/generating a personalized/customized Head Related Transfer Function (HRTF) from an image captured using a portable device such as a Smartphone having an a camera, according to an embodiment of the disclosure.

Referring to FIG. 1 a method 100 for creating/generating a personalized/customized HRTF is shown in accordance with an embodiment of the disclosure. Specifically, a personalized/customized HRTF can be created/generated from an image captured using a portable device.

The method 100 can include an image capturing step 102, a reference determination step 104, an analyzing step 106 and a personalizing step 108.

At the image capturing step 102, at least one image of an ear can be captured using a portable device having an image capturing device. For example, the portable device can correspond to a Smartphone having a camera.

At the reference determination step 104, a scale factor in relation to the captured image can be determined. Preferably, the scale factor is determined without having to rely on manual measurement. The scale factor can be used as a basis for auto-scaling as will be discussed later in further detail.

In one embodiment, the scale factor can be determined based on eye separation (i.e., Interpupillary Distance). In another embodiment, the scale factor can be determined based on average tragus length. In yet another embodiment, the scale factor can be determined based on focus point of the image capturing device. In yet a further embodiment, the scale factor can be determined based on a reference object (e.g., a business card or a can) and/or a depth camera with a known focal length.

In regard to determination of scale factor based on eye separation, a user can capture two images. One image can be a photograph the user took of himself/herself (e.g. a selfie taken with the portable device at approximately half an arm's length away) where the eyes of the user can be detected. Another image can be a photograph of one ear of the user taken, for example, by having the user rotate his/her head after the first image is captured. Specifically, after the user has taken a selfie (i.e., the first image) of himself/herself where the eyes of the user can be detected, the user can rotate his/her head to capture an image of his/her ear (i.e., the second image which can correspond to the aforementioned image of an ear captured at the image capturing step 102) with the portable device is held in place for both images (i.e., position of the portable device when the selfie was taken is retained for capturing the second image). Alternatively, it is also possible to sweep the portable device in an arc (i.e., from the eyes to the ear or from the ear to the eyes), while keeping the distance between the portable device and the user's head substantially constant during the sweep, to capture both images of the eyes and the ear. For example, the portable device can be held, by a user, at arm's length while taking a selfie (i.e., the first image) of himself/herself where the eyes of the user can be detected and after the selfie is taken, the user can sweep, while keeping the portable device at the same arm's length (per when the first image was captured), to the side of his/her head to capture an image of his/her ear (i.e., the second image). It is contemplated that physical eye separation is typically approximately 6.5 cm for adults (appreciably, eye separation for children can differ). Therefore, a scale factor can be derived. For example, for the first image, the separation, image wise, between two eyes can be 50 pixels. Hence, 50 pixels, image wise, can correspond to 6.5 cm in physical separation (i.e., 50 pixels can, for example, correspond to 6.5 cm in terms of physical dimension/measurement). Using an image dimension to physical dimension ratio of 50 pixels:6.5 cm (i.e., based on the first image), it can be possible to translate the image of the ear (i.e., the second image) to physical dimensions.

In regard to determination of scale factor based on average tragus length, it is contemplated that the tragus length is relatively consistent across different ears. Therefore, the tragus length can be used as a reference in analogous manner per earlier discussion in relation to eye separation (i.e., translation of the image of an ear to physical dimensions based on known/standard tragus length).

In regard to determination of scale factor based on focus point of the image capturing device, it is contemplated that the image capturing device (e.g., a camera) can have an autofocus feature. Accordingly, the image capturing device can autofocus on the user's ear when the user uses the image capturing device to capture an image of his/her ear. The autofocus is based on distance of lens to object (i.e., user's ear). The present disclosure contemplates that knowing the distance of the lens to the ear and the focal length (i.e., Lens's Field Of View) is sufficient to determine the scale factor.

At the analyzing step 106, ear features and geometrical properties, based on the image of the ear, can be detected using an Active Shape Model (ASM). ASM (developed by Tim Cootes and Chris Taylor in 1995) is commonly known to correspond to a distribution model of the shape of an object (e.g., shape of a ear) which iteratively deforms to fit to an example of the object in a new image (e.g., captured image of a user's ear) and the shape is constrained by a point distribution model (PDM). In this regard, image based geometrical properties (e.g., in terms of pixels) such as length of Concha, length of Tragus, width and/or height of the ear can be extracted/determined from control points which can be deformed in accordance with the PDM. Accordingly, the control points can conform to the shape of the ear based on the image captured (i.e., image of the ear) at the image capturing step 102. The control points will be discussed later in further detail with reference to FIG. 2. ASM is described in further detail in Active Shape Models—Their Training and Application, T. F. Cootes, C. J. Taylor, D. H. Cooper, and J. Graham, Department of Medical Biophysics, University of Manchester, Oxford Road, Manchester M13 9PT, England, Computer Vision And Image Understanding, Vol. 61, No. 1, January, pp. 38-59, 1995, the entirety of which are incorporated by reference for all purposes.

At the personalizing step 108, a personalized HRTF can be derived/determined based on image based geometrical properties (e.g., in terms of pixels) of the user's ear as determined at the analyzing step 106 and the scaling factor as determined at the reference determination step 104. This will be discussed later in further detail with reference to an exemplary scenario).

The present disclosure contemplates that the physical dimensions of a user's ear can be derived based on image based geometrical properties (e.g., in terms of pixels) and the scaling factor. Such physical dimensions can be basis for deriving/determining a personalized HRTF.

Moreover, the present disclosure contemplates that physical geometries of the user's ear can be determined at either the analyzing step 106 or the personalizing step 108.

Figure 2A:
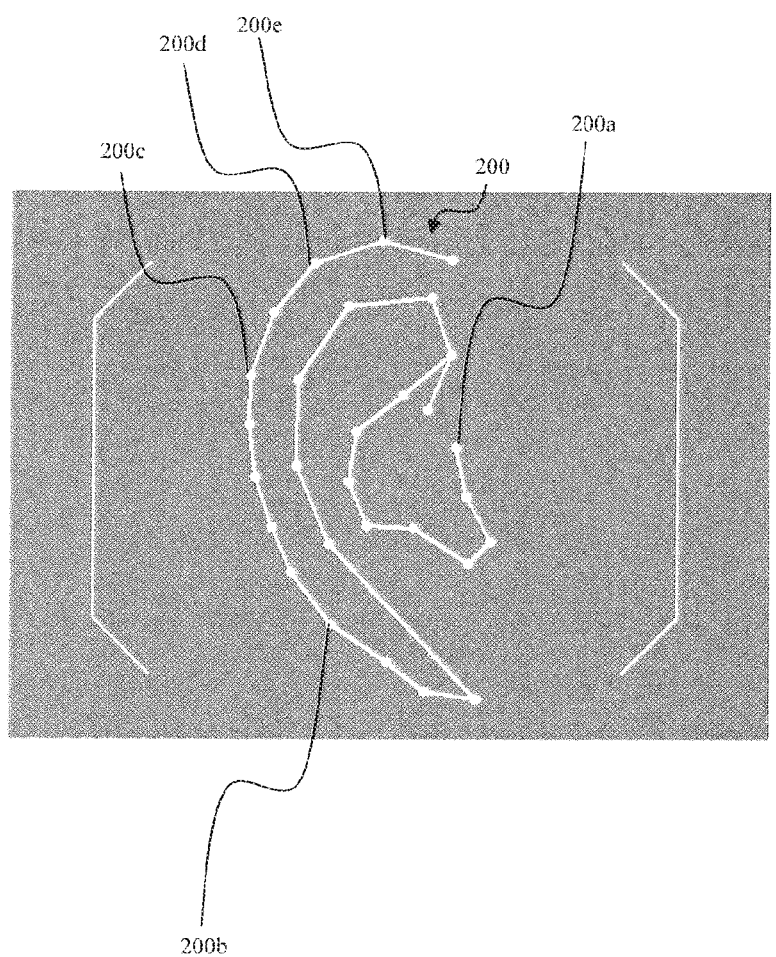
FIG. 2a shows an Active Shape Model having a plurality of control points which can be trained using a plurality of samples, according to an embodiment of the disclosure.

FIG. 2a shows an Active Shape Model 200 having a plurality of control points discussed earlier with reference to FIG. 1. For example, the Active Shape Model 200 can include a first control point 200a, a second control point 200b, a third control point 200c, a fourth control point 200d and a fifth control point 200e. As shown, the Active Shape Model 200 can correspond to the shape of an ear. Specifically, the plurality of control points can be arranged to correspond to the shape of an ear. The Active Shape Model 200 can be derived based on training using a plurality of samples. The samples can correspond to a plurality of ear images (i.e., more than one image of an ear). Preferably, the samples are obtained from different subjects (i.e., from different people). For example, the Active Shape Model 200 can be trained from 20 different subjects (i.e., 20 different ears). In an exemplary scenario, the Active Shape Model 200 can be derived by positioning the control points, in a consistent manner, in each of the samples.

Figure 2B:
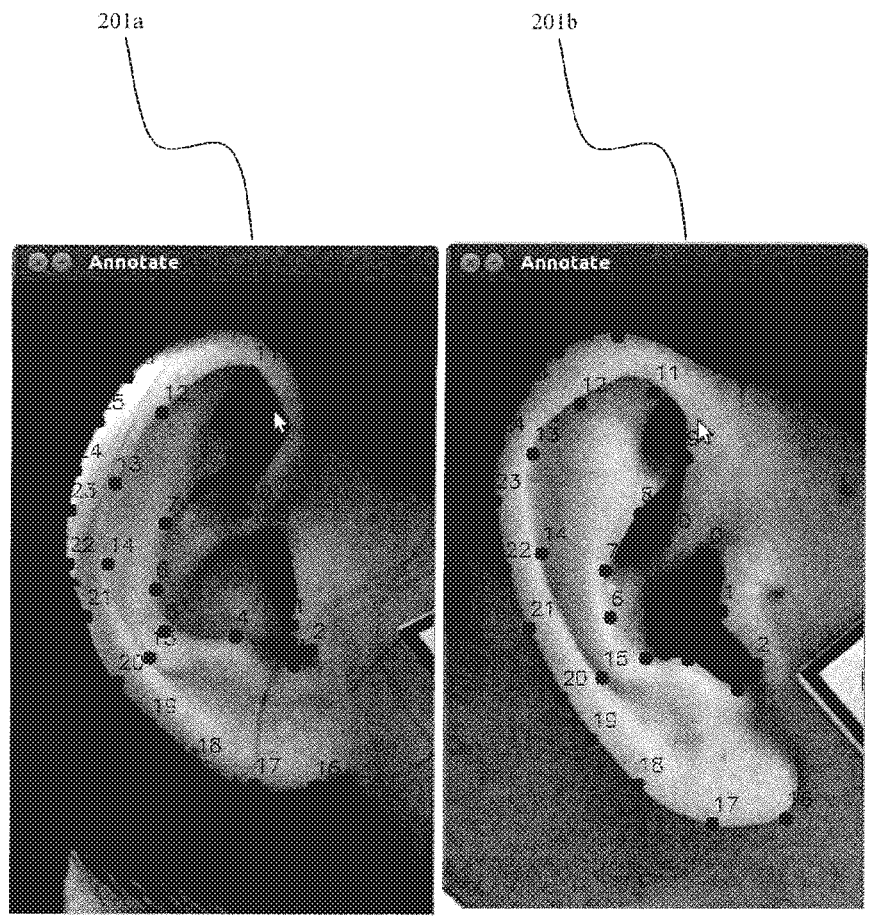
FIG. 2b shows that the plurality of samples of FIG. 2a can include a first sample and a second sample, according to an embodiment of the disclosure.

Specifically, referring to FIG. 2b, the plurality of samples as mentioned in FIG. 2a can include a first sample 201a and a second sample 201b. Each of the control points can consistently be positioned at respective different locations of an ear. For example, one of the control points (e.g., label 16) can be consistently positioned at one location (e.g., the earlobe) of an ear shown in each of the samples 201a/201b. Appreciably, by doing so for each control point, an average, based on the same control point (e.g., label 16) being positioned at substantially identical location (e.g., earlobe) of an ear across the samples, can be obtained. Therefore, from the training using a plurality of samples, an average shape of an ear can be derived. In this regard, the Active Shape Model 200 can be akin to a generic template which represents an average ear (i.e., based on training using the plurality of samples) and its underlying PDM. Such a generic template can be a base for iterative deformation for a new image (i.e., a new image of an ear as captured at the image capturing step 102). Additionally, the underlying PDM is, at the same time, derived when training the Active Shape Model 200. Specifically, limits of iterative deformation of the distribution of the control points (i.e., deviation of position of the control points per the Active Shape Model 200) based on a new image (i.e., a new image of an ear as captured during the image capturing step 102), as will be discussed in further detail with reference to FIG. 2c, can be constrained by the PDM as trained using the plurality of samples.

In accordance with an embodiment of the disclosure, the portable device can include a screen (not shown) and the control points of the Active Shape Model 200 can be presented via a graphics user interface (GUI) displayed on the screen. As shown, the Active Shape Model 200 can include a plurality of control points 200a/200b/200c/200d/200e.

Figure 2C:
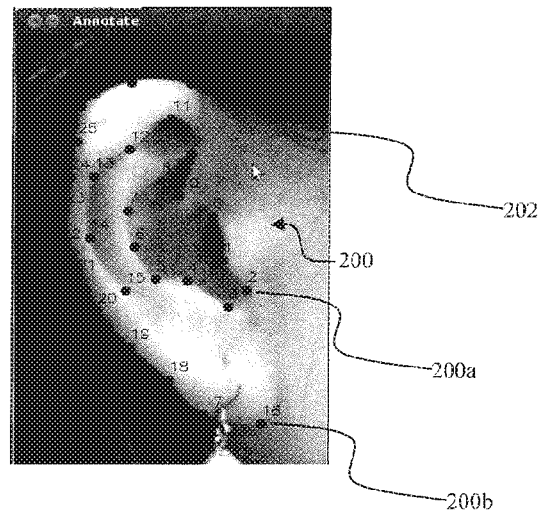
FIG. 2c shows the control points of FIG. 2a being conformed to the shape of a user's ear, according to an embodiment of the disclosure.

FIG. 2c shows the Active Shape Model 200 of FIG. 2a conformed to the shape of a user's ear (i.e., the aforementioned image of an ear as captured during the image capturing step 102) in accordance with an embodiment of the disclosure.

The control points can correspond to the aforementioned new image earlier discussed in FIG. 2a. In one exemplary application, the Active Shape Model 200 derived (i.e., based on training using a plurality of samples as discussed earlier) can be displayed on the screen of a portable device and as a user using the portable device positions the portable device so as to capture an image of his/her ear (i.e., new image), at least a portion of the screen can display a real-time image 202 of the user's ear. Appreciably, the real-time image 202 can change according to how the user positions the portable device. As such, the Active Shape Model 200 can iteratively deform accordingly. That is, the control points (e.g., the first to fifth control points 200a/200b/200c/200d/200e) can iteratively change to match the image of the user's ear as displayed on the screen. As such, the control points can, for example, to be visually perceivable to deviate in position so that the control points substantially overlay the image of the user's ear. Specifically, as shown in FIG. 2b, the Active Shape Model 200 should substantially overlay the image of the user's ear. More specifically, the control points of the Active Shape Model 200 as shown in FIG. 2a can conform to the shape of the user's ear. Therefore, the positions of the control points 200a/200b/200c/200d/200e of the Active Shape Model 200 can be iteratively changed in a manner so as to outline the shape of the user's ear (i.e., as shown by the real-time image 202 of the user's ear).

Preferably, an indication of stability (e.g., in the form of an audio feedback such as a "beep") can be provided to indicate whether an image currently displayed on the screen is suitable for capture. For example, an indication of stability can be provided when the control points of the Active Shape Model 200 cease to change in position (i.e., stop moving). That is, the Active Shape Model 200 can be considered to be substantially conformed to the shape of the user's ear (i.e., per real-time image 202 of the user's ear). Appreciably, in this manner, some form of "goodness" measure can be provided. Additionally, in this manner, it is also possible to perform a real-time detection of the user's ear as the user positions the portable device in preparation for image capture at the image capturing step 102.

Moreover, the present disclosure contemplates that it is desirable to improve ear detection performance so as to avoid any "spurious" image captures in which an image which looks like the user's ear (i.e., which is not actually an image of the user's ear) is captured.

Therefore, in accordance with an embodiment of the disclosure, further feedback signals (i.e., in addition to the aforementioned indication of stability) can be provided to indicate whether the portable device has been positioned appropriately. In one example, feedback signals from motion sensors such as a gyroscope/accelerometer and/or magneto sensors carried by the portable device can be provided to indicate whether the portable device is positioned appropriately.

Alternatively, focus distance associated with the image capturing device carried by the portable device can be used as a parameter in connection with improving ear detection performance. Specifically, focus distance associated with the image capturing device carried by the portable device can be used to determine the distance of an object of interest to the capturing device. The present disclosure contemplates that, In practice, the distance between the ear (i.e., an object of interest) and the capturing can be quite close (e.g. about 10 cm apart), so there is need only to consider the presence of an ear in the captured image(s) (e.g., camera video stream) when the focus distance is around 10 cm (e.g. only focus distance from 2 to 20 cm needs to be considered). Therefore, when the focus of the image capturing device is, for example, 1.2 meter in one instance, it can be safely assumed the object of interest in camera video stream as captured by the image capturing device in that instance does not correspond to an appropriate ear image.

The foregoing will be put in context based on an exemplary scenario in accordance with an embodiment of the disclosure hereinafter.

In one exemplary scenario, a portable device such as a Smartphone with a camera which can be used to a user to capture an image of his/her ear and a screen which is capable of displaying a GUI presenting an ASM related to an ear. The user can use the portable device to capture a selfie per earlier discussion so as to obtain a scaling factor. The scaling factor can be used as a basis for auto-scaling the captured image of an ear.

In accordance with an embodiment of the disclosure, the portable device can include software capable of presenting the GUI on the screen and conforming control points of the Active Shape Model 200 to the image of the user's ear to be captured. Specifically, the portable device can include a processor which can be configured to deform the Active Shape Model 200 so that the control points conform to the shape of the user's ear per the image of the user's ear to be captured. Upon receiving an indication of stability, preferably, the user can proceed to capture an image of his/her ear (i.e., at the image capturing step 102). Alternatively, an image of the user's ear can be captured automatically upon receipt of an indication of stability (e.g., operatively alike Quick Response Code scanning or Barcode scanner). Therefore, an image of the user's ear (preferably with the Active Shape Model 200 overlaying the image of the user's ear as shown in FIG. 2b) can be captured. Based on the captured image of the user's ear, image based geometrical properties and/or features of the user's ear can be extracted/determined (e.g., in terms of pixels) at the analyzing step 106. Moreover, based on the scaling factor, which can be determined during the reference determination step 104, auto-scaling of the captured image of the user's ear can be performed so as to determine physical geometries and/or features of the user's ear (e.g., geometrical properties and/or features in terms of pixels can be converted/translated to physical dimensions in terms of centimeters).

Based on the determined physical geometries and/or features of the user's ear (which can, for example, be performed by the processor at, for example, the analyzing step 106), a search, which can be performed at the personalizing step 108, can be conducted in a HRTF database (e.g., an online database having a collection/library of HRTFs) to find a HRTF which matches/most closely matches such physical geometries and/or features. In this manner, a personalized HRTF can be created/generated. Appreciably, if it is desired to find a HRTF for each ear of a user (e.g., both the user's left and right ears), the earlier discussed method 100 of FIG. 1 can be applied accordingly. It is contemplated that the HRTF found (e.g., based on the earlier discussed search conducted in a HRTF database) for each ear can either be the same or different.

Alternatively, personalized HRTF can be created/generated, at the personalizing step 108, by perturbing an existing HRTF (e.g., a HRTF available in a HRTF database). Perturbation of an existing HRTF can be by manner of interpolating one than one Head Related Impulse Response (HRIR). Specifically, based on the determined physical geometries and/or features of the user's ear, a search can be conducted in a database (e.g., an online database having a collection/library of HRIRs) to find more than one HRIR (i.e., HRIR-A and HRIR-B) which most closely match such physical geometries and/or features. A process of cross-fading of the found HRIRs can be performed to generate an interpolated HRIR (i.e., "HRIR-Interpolated"). A further process of Fourier transformation can be performed to derive the HRTF. Appreciably, personalized HRTF can be created/generated based the interpolated HRIR. In relation to cross-fading, fading coefficient for each found HRIR can be inversely proportional to distance (e.g., Euclidean or Mahalanobis distance). For example:

HRIR-A=[a1, a2, a3, a25];

HRIR-B=[b1, b2, b3, b25];

HRIR-Interpolated=[a1*c+b1*(1−c),], where "c" represents the aforementioned distance and ranges from 0 to 1.

In another alternative, based on the determined physical geometries and/or features of the user's ear, a three-Dimensional (3D) model of the user's ear can be constructed. With 3D geometry based on the constructed 3D model, wave propagation simulation methods (e.g., "Efficient and Accurate Sound Propagation Using Adaptive Rectangular Decomposition" by Raghuvanshi N., Narain R., and Lin M. C.—IEEE Transactions on Visualization and Computer Graphics 2009) can be used to create/generate a personalized HRTF.

Therefore, given that it is possible to obtain a personalized/customized HRTF simply by manner of a user capturing an image of his/her ear using, for example, a Smartphone. It is appreciable that the present disclosure facilitates creating/generating personalized HRTF(s) in a user friendly and/or efficient manner. Moreover, a personalized/customized HRTF can also be created/generated in real-time.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

For example, other than interpolating HRIR, the present disclosure contemplates that it is possible to also interpolate ear models to match user ear features/geometries using 3D morphing methods (e.g. "Cross-Parameterization and Compatible Remeshing of 3D Models" by Kraevoy V., Sheffer A., ACM Transactions on Graphics (TOG)—Proceedings of ACM SIGGRAPH 2004) and performing acoustic simulation to derive a new HRIR. The new HRIR can be Fourier transformed to derive the HRTF).

In another example, the present disclosure contemplates the possibility of capturing the dimension of the user's head to further improve on the HRTF quality. Specifically, the present disclosure contemplates that the dimension of the head (head width and depth) may be important for HRTF computation, Capturing the head dimension can be possible since, in accordance with an embodiment of the disclosure, both the frontal and side images (i.e., in relation to the earlier discussed "selfie(s)"). Alternatively, a head detector (even one based on ASM but with head-model instead) can be used for capturing head dimension.

The method for generating a customized/personalized head related transfer function can be combined/integrated with a system/method for customizing audio experience (which is described below), a system/method for generating customized spatial audio with head tracking (which is described below), and/or vice versa. Each of the methods/systems may utilize specialized and/or generalized processors/devices to implement the different embodiments of the invention disclosed herein. Further, non-transitory computer-readable mediums containing computer readable instructions for implementing the methods described herein may also be utilized.

A System and a Processing Method for Customizing Audio Experience

The present disclosure relates to a system (and a processing method in association with the system) for customizing audio experience. Customization of audio experience can be based on derivation of at least one customized audio response characteristic which can be applied to an audio device used by a person. At the audio device, input audio signals can be processed based on the customized audio response characteristic to produce output audio signals which can be audibly perceived by the person. In this regard, the system, and processing method in association therewith, can be operated to customize audio experience for a person by manner of deriving/generating at least one customized audio response characteristic which can be unique to the person.

Audio response characteristic can be associated with audio related transfer function. Audio related transfer function can relate to, for example, head related impulse response (HRIR) and/or binaural room impulse response (BRIR). In a specific example, audio related transfer function can be based on head related transfer function (HRTF) and/or binaural room transfer function (BRTF) which can be derived based on suitable transformation (e.g., Fourier transformation) of respective HRIR and/or BRIR.

These will be discussed in further detail with reference to FIG. 3 to FIG. 6 hereinafter.

Figure 3:
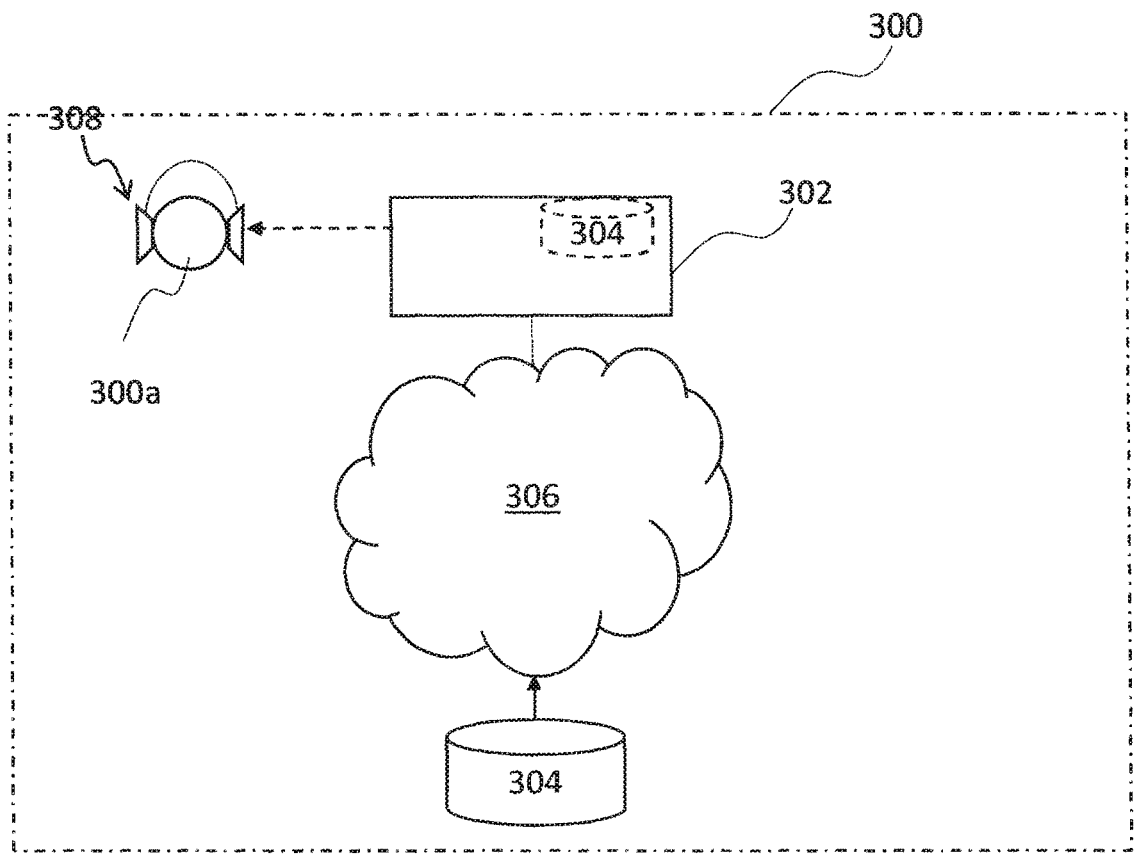
FIG. 3 shows a system operable for customizing audio experience and which includes a processing apparatus, according to an embodiment of the disclosure.

Referring to FIG. 3, a system 300 is shown, according to an embodiment of the disclosure. Specifically, the system 300 can be operable for customizing audio experience. More specifically, the system 300 can be operable for customizing audio experience for a person 300a.

The system 300 can include a processing apparatus 302, one or more database(s) 304 and a communication network 306. The system 300 can further include an audio device 308. The audio device 308 can be used by the person 300a to experience audio signals.

The processing apparatus 302 can, for example, correspond to a computer (e.g., a desktop computer, a Smartphone, an electronic tablet, a laptop computer, a media player or a combination of two or more of the aforementioned examples).

The one or more databases 304 can, for example, correspond to one or more HRIR based databases and/or one or more BRIR based databases (or, alternatively, corresponding one or more HRTF and/or BRTF based databases). In one example, the database(s) 304 can correspond to HRIR/HRTF database(s) containing HRIRs/HRTFs measured, extracted and/or parameterized in respect with individual subjects and/or different artificial head-and-torso simulators. In another example, the database(s) 304 can correspond to BRIR/BRTF database(s) containing BRIRs/BRTFs measured, extracted and/or parameterized in different types of rooms with various parameters such as source/receiver distances and/or azimuth angles considered. In yet another example, the subject individual's image can be matched with a database which may be storing the features or parameters of BRIRs/BRTFs/HRIRs/HRTFs (i.e., instead of the actual BRIRs/BRTFs/HRIRs/HRTFs).

The communication network 306 can, for example, correspond to an internet network or an intranet network.

The audio device 308 can, for example, correspond to a headset which can be worn by a person 300a for audio experience of audio signals. In one embodiment, the audio device 308 can include an audio source (not shown), an audio processor (not shown) and a pair of speaker drivers (not shown). The audio source can be coupled to the audio processor. The audio processor can be coupled to the pair of speaker drivers.

The processing apparatus 302 can be coupled to the database(s) 304. Moreover, the processing apparatus 302 can be coupled to the audio device 308. The processing apparatus 302 can be coupled to the database(s) 304 and the audio device 308 by manner of one or both of wired coupling and wireless coupling. In this regard, the processing apparatus 302 and the database(s) 304 can be configured to signal communicate with each other. Furthermore, the processing apparatus 302 and the audio device 308 can be configured to communicate with each other.

Moreover, the processing apparatus 302 can be one or both of directly coupled and indirectly coupled to the database(s) 304.

In one embodiment, one or more databases 304 can, for example, be carried by one or more host devices (e.g., one or more servers). The one or more databases 304 (i.e., carried by one or more host devices) can be coupled to communication network 306. Moreover, the processing apparatus 302 can be coupled to the communication network 306. In this regard, the processing apparatus 302 and the database(s) 304 can be considered to be indirectly coupled in that the processing apparatus 302 is coupled to the database(s) 304 via the communication network 306.

In another embodiment, one or more databases 304 can be carried by the processing apparatus 302. In this regard, the processing apparatus 302 and the database(s) 304 can be considered to be directly coupled.

In yet another embodiment, one or more databases 304 can be carried by one or more host device (e.g., one or more servers) and one or more databases 304 can be carried by the processing apparatus 302. The one or more databases 304 (carried by one or more host devices and/or the processing apparatus 302) can be coupled to the communication network 306. In this regard, one or more database(s) 304 can be directly coupled to the processing apparatus 302 whereas one or more other database(s) 304 can be indirectly coupled (i.e., via the communication network 306) to the processing apparatus 302.

In general, the processing apparatus 302 can be configured to capture one or more images of a person 300a and/or receive one or more captured images of a person 300a, and process the captured image(s) to generate at least one input signal. The processing apparatus 302 can be further configured to process the input signal(s) to generate at least one output signal.

The database(s) 304 can be associated with at least one database signal. A database signal can correspond to a dataset contained in the database(s) 304. A dataset can, in one example, correspond to the aforementioned HRIR/HRTF. In another example, a dataset can correspond to the aforementioned BRIR/BRTF.

In one embodiment, the processing apparatus 302 can be configured to process the input signal(s) based on database signal(s) communicable from the database(s) 304 to generate/produce output signal(s).

Generated output signal(s) can be communicated from the processing apparatus 302 for further processing. Specifically, output signal(s) can be communicated from the processing apparatus 302 to the audio device 308 for further processing. More specifically, one or more input audio signals at the audio device 308 can be processed based on the received output signal(s) to produce/generate one or more output audio signals.

Yet more specifically, at the audio device 308, input audio signals can be generated and communicated from the audio source to the audio processor. The audio processor can be configured based on the output signal(s) communicated from the processing apparatus 302. Specifically, the audio processor can be configured to process the input audio signals based on the output signal(s) to generate/produce output audio signals. Generated output audio signals can be communicated from the audio processor to the speaker drivers.

The output audio signal(s) can be output from the audio device 308 via the speaker drivers and can be audibly perceived by a person 300a wearing the audio device 308.

In one embodiment, a captured image of a person 300a can be processed to extract/determine input data associated with the person 300a. Input data associated with a person 300a can, for example, correspond to biometric data (one or more pinna features, distance associated with separation of the eyes etc.) associated with the person 300a. In this regard, the input signal(s) can correspond to biometric data associated with a person 300a and the output signal(s) can correspond to output data corresponding to audio response characteristic(s) (e.g., audio related transfer function) which can be unique to the person 300a. Therefore, the output signal(s) can be considered to be generated for facilitating the customization of audio perception experienced (i.e., audio experience) by the person 300a.

Generally, the present disclosure contemplates that audio experience can be customized for a person 300a by manner of deriving/generating at least one customized audio response characteristic (i.e., the output signal(s)) for a person 300a. By processing input audio signals based on the customized audio response characteristic(s) to generate output audio signals for audible perception by the person 300a, audio experience can be customized for the person 300a.

Image capture of a person 300a, processing of the captured image(s) to generate the input signal(s) and processing the input signal(s) to produce/generate the output signal(s) will be discussed in further details with reference to FIG. 4 hereinafter.

Figure 4:
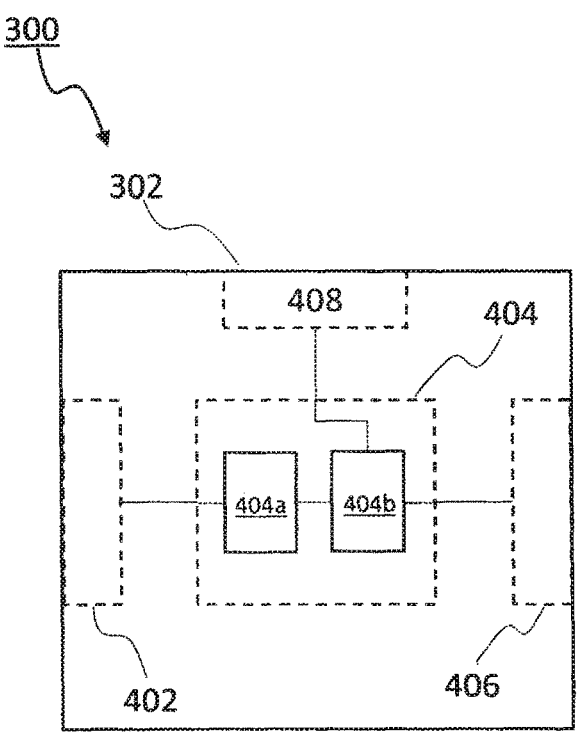
FIG. 4 shows the processing apparatus of FIG. 3 in further detail, according to an embodiment of the disclosure.

FIG. 4 shows the processing apparatus 302 in further detail, in accordance with an embodiment of the disclosure.

As shown, the processing apparatus 302 can include an input portion 402, a processing portion 404 and an output portion 406. The processing apparatus 302 can further include a transceiver portion 408. The input portion 402 can be coupled to the processing portion 404. The processing portion 404 can be coupled to the output portion 406. Additionally, the processing portion 404 can be coupled to the transceiver portion 408.

The input portion 402 can, in one embodiment, correspond to an image capturing device configured to be operable in a manner so as to capture one or more images of a person 300a. In another embodiment, the input portion 402 can correspond to a transceiver configured to receive one or more captured images of a person 300a from an input source (not shown). The input source can, for example, be a remote image capturing device which can be connected to the input portion 402 by manner of one or both of wired coupling and wireless coupling.

The processing portion 404 can, in one embodiment, correspond to a microprocessor and can include an image processing part 404a and a customization processing part 404b. The image processing part 404a can be coupled to the input portion 402. Moreover, the image processing part 404a can be coupled to the customization processing part 404b. The customization processing part 404b can be coupled to one or both of the output portion 406 and the transceiver portion 408.

The image processing part 404a can be configured to receive one or more captured images of a person 300a for further processing to produce/generate one or more input signals. As mentioned earlier, the input signal(s) can correspond to biometric data associated with a person 300a. In one embodiment, the image processing part 404a can be configured to receive a captured image and process the captured image via image processing techniques for automatic extraction of biometric data associated with a person 300a. The biometric data extracted can, in one example, be in relation to the pinna/auricle of a person's 300a ear. In another example, the biometric data extracted can be in relation to the head/shoulder of a person 300a. Input signals corresponding to extracted biometric data can be communicated from the image processing part 404a to the customization processing part 404b.

The customization processing part 404b can be configured to receive one or more input signals for further processing to produce/generate one or more output signals. The input signal(s) can be processed based on one or more processing strategies. For example, the input signal(s) can be processed based on one or more of a first processing strategy, a second processing strategy and a third processing strategy, or any combination thereof.

In one embodiment, the input signal(s) can be processed based on any one of the first processing strategy, the second processing strategy and the third processing strategy. In another embodiment, the input signal(s) can be processed based on any combination of the first processing strategy, the second processing strategy and the third processing strategy.

The first processing strategy can, for example, correspond to a multiple-match processing based strategy.

In regard to the multiple-match processing based strategy, the present disclosure contemplates that biometric data extracted from a captured image can, in one embodiment, be communicated (e.g., via the transceiver portion 408) from the processing apparatus 302 to the database(s) 304 to identify and retrieve one or more datasets (e.g., HRIRs/HTRFs or BRIRs/BRTFs) matching the biometric data. Specifically, the processing apparatus 302 can be configured to identify and retrieve one or more datasets matching the biometric data Further, in regard to the multiple-match processing based strategy, the present disclosure contemplates that, in another embodiment, the processing apparatus 302 can be trained. As will be discussed later in further detail, training of the processing apparatus 302 can, for example, be based on one or both of the second processing strategy and the third processing strategy. Specifically the processing apparatus 302 can, for example, be trained (e.g., based on the second and/or third processing strategies) and one or more datasets (e.g., HRIRs/HTRFs or BRIRs/BRTFs) can be identified and retrieved by the trained processing apparatus 302 based on the biometric data.

The present disclosure further contemplates that the retrieved dataset(s) may not be considered to be a perfect match in relation to the biometric data.

Specifically, the present disclosure contemplates that each dataset retrieved can be associated with a certain degree of mismatch in relation to the biometric data. In this regard, the processing apparatus 302 can be configured (e.g., by manner of programming) to determine confidence level associated with each retrieved dataset in relation to the biometric data. Confidence level can be a measurement of an extent of match or mismatch of a retrieved dataset with reference to the biometric data. Therefore, confidence level can be considered a form closeness measure (i.e., extent of match or extent of mismatch) quantifying the extent of match/extent of mismatch between the retrieved dataset and the biometric data.

For example, based on the biometric data, a first dataset (i.e., a first BRIR), a second dataset (i.e., a second BRIR) and a third dataset (i.e., a third BRIR) can be retrieved. The first BRIR can be considered to be the closest match to the biometric data as compared with the second and third BRIRs. The second BRIR can be considered to be the next closest match to the biometric data followed by the third BRIR. Where a perfect match can be quantified with a confidence level of "1" and a total mismatch quantified with a confidence level of "0", the first to third BRIRs can, for example, be quantified with a confidence level of "0.8," "0.6" and "0.4" respectively.

Each of the datasets (e.g., a first BRIR, a second BRIR and a third BRIR) retrieved based on the multiple-match processing based strategy can be considered an intermediate processor dataset. For example, the first BRIR, the second BRIR and the third BRIR can be considered to correspond to a first intermediate processor dataset, a second intermediate processor dataset and a third intermediate processor dataset respectively.

In this regard, one or more intermediate processor datasets can be generated/derived based on the first processing strategy. The processing apparatus 302 can be configured, as will be discussed later in further detail, to further process the intermediate processor dataset(s) to generate/produce an output signal.

The second processing strategy can, for example, correspond to a multiple-recognizer based processing strategy.

In regard to the multiple-recognizer based processing strategy, the present disclosure contemplates that the processing apparatus 302 can be configured as a multiple recognizer. Specifically, the processing apparatus 302 can, by manner of training, be configured as a multiple recognizer. More specifically, the processing apparatus 302 can be trained to retrieve one or more datasets (e.g., one or more BRIRs) based on a plurality of training parameters.

The plurality of training parameters can, for example, be based on feature type associated with biometric data (i.e., biometric data feature type). Specifically, the plurality of training parameters can be based on a plurality of feature types associated with biometric data. Images of one or more than one person can be captured for each feature type associated with biometric data.

Examples of biometric data, as discussed earlier, can include pinna feature(s) and distance associated with separation of the eyes (i.e., eyes separation). A further example of biometric data can include size of the person's 300a head (i.e., head radius). Moreover, pinna feature can, for example, be related to size of the pinna (i.e., pinna radius).

In this regard, head radius can be considered to be an example of a first biometric data feature type and pinna radius can be considered to be an example of a second biometric data feature type. Moreover, eyes separation can be considered to be an example of a third biometric data feature type.

Furthermore, in an example, images of five persons (i.e., a first subject "A", a second subject "B", a third subject "C", a fourth subject "D" and a fifth subject "E") can be captured in relation to each biometric data feature type.

The training parameters can, in one example, include the first and second biometric data feature types. The training parameters can, in another example, further include the third biometric data feature type. In this regard, the training parameters can, in one example, include five sets (i.e., subjects "A" to "E") of each of the first and second biometric data feature types. The training parameters can, in another example, further include five sets (i.e., subjects "A" to "E") of the third biometric data feature type.

As an example, the processing apparatus 302 can be trained, based on three biometric data feature types, to be a three-type recognizer (i.e., multiple-recognizer). Specifically, the processing apparatus 302 can be trained to be a first type recognizer (e.g., based on head radius of each of subjects "A" to "E"), a second type recognizer (e.g., based on pinna radius of each of subjects "A" to "E") and a third type recognizer (e.g., based on eye separation for each of subjects "A" to "E"). Additionally, in analogous manner as discussed earlier with reference to the multiple-match processing based strategy, one or more of the first to third type recognizers can be configured to identify and retrieve one or more datasets (e.g., HRIRs/HTRFs or BRIRs/BRTFs) from the database(s) 304 given corresponding one or more of new first biometric data feature type, new second biometric data feature type and new third biometric data feature type. The new biometric data feature type(s) can be based on a new subject (i.e., a sixth subject "F").

The present disclosure contemplates that training parameters can be based on other features such as features associated with the datasets. For example, spectral magnitude of a BRIR, spectral notch and peaks of a BRIR can be used as training parameters.

In one example, the processing apparatus 302 can be trained to be a first type recognizer based on BRIR spectral peaks and notches. The processing apparatus 302 can be further trained as a second type recognizer based on BRIR spectral magnitude. The first type recognizer (i.e., based on BRIR spectral peaks and notches) can emphasize certain spatial characteristics such as sensitivity to the elevation of audio source. The second type recognizer (i.e., based on BRIR spectral magnitude) can relate to shape of a person's head.

The present disclosure further contemplates that other than the aforementioned feature type(s), training of the processing apparatus 302 (i.e., so as to be configured as a multiple recognizer) can be by manner of one or more Machine learning methods such as Neural network and statistical Mixture Model.

Each of the datasets retrieved based on the multiple-recognizer based processing strategy can be considered an intermediate processor dataset. In one example, the first to third type recognizers can each be configured to identify and retrieve one or more datasets (i.e., one or more intermediate processor datasets).

In one specific example, the first type recognizer can be configured to identify and retrieve a first BRIR and a second BRIR, the second type recognizer can be configured to identify and retrieve a third BRIR and the third type recognizer can be configured to identify and retrieve a fourth BRIR and a fifth BRIR. The first to fifth BRIRs can be considered to correspond to a first intermediate processor dataset, a second intermediate processor dataset, a third intermediate processor dataset, a fourth intermediate processor dataset and a fifth intermediate processor dataset respectively.

In another specific example, the first type recognizer can be configured to identify and retrieve a first BRIR and a second BRIR, and the third type recognizer can be configured to identify and retrieve a third BRIR. The first to third BRIRs can be considered to correspond to a first intermediate processor dataset, a second intermediate processor dataset and a third intermediate processor dataset respectively.

In yet another specific example, the first type recognizer can be configured to identify and retrieve a first BRIR, the second type recognizer can be configured to identify and retrieve a second BRIR and the third type recognizer can be configured to identify and retrieve a third BRIR. The first to third BRIRs can be considered to correspond to a first intermediate processor dataset, a second intermediate processor dataset and a third intermediate processor dataset respectively.

In this regard, one or more intermediate processor datasets can be generated/derived based on the second processing strategy. The processing apparatus 302 can be configured, as will be discussed later in further detail, to further process the intermediate processor dataset(s) to generate/produce an output signal.

The third processing strategy can, for example, correspond to a cluster based processing strategy.

In regard to the cluster based processing strategy, the present disclosure contemplates that the datasets (e.g., BRIRs) of/from the database(s) 304 can be clustered (i.e., grouped) using methods such as K-means based clustering, Hierarchical Distribution based clustering, Density-based clustering and machine-learning (AI) based clustering (e.g., Support Vector Machine clustering and deep convolutional neural network). Specifically, in an example, one or more datasets can be retrieved from the database(s) 304 and one or more cluster groups can be derived by clustering the retrieved datasets.

In one embodiment, the processing apparatus 302 can be subjected to cluster based training. Specifically, the processing apparatus 302 can be subjected to training by the one or more cluster groups derived. Preferably, datasets that are considered similar (e.g., similar BRIRs) can be grouped to form a cluster.

For example, based on the earlier example of images of five persons (i.e., a first subject "A", a second subject "B", a third subject "C", a fourth subject "D" and a fifth subject "E") being captured in relation to each biometric feature type, a first dataset (i.e., a first BRIR), a second dataset (i.e., a second BRIR), a third dataset (i.e., a third BRIR), a fourth dataset (i.e., a fourth BRIR) and a fifth dataset (i.e., a fifth BRIR) can be obtained. The first and second BRIRs can, for example, be grouped as a first cluster whereas the third, fourth and fifth BRIRs can, for example, be grouped as a second cluster. Moreover, it is appreciable the images of the aforementioned example of five persons can correspond to a first image (i.e., associated with the first dataset), a second image (i.e., associated with the second dataset), a third image (i.e., associated with the third dataset), a fourth image (i.e., associated with the fourth dataset) and a fifth image (i.e., associated with the fifth dataset).

The processing apparatus 302 can be trained by manner of association. For example, the processing apparatus 302 can be trained by manner of associating the first image with the first cluster, associating the second image with the first cluster, associating the third image with the second cluster and associating the fourth image with the second cluster.

Appreciably, the processing apparatus 302 trained by one cluster (i.e., a group of datasets) can correspond to a model. Therefore, when trained by multiple clusters (e.g., a first cluster, a second cluster and a third cluster), the processing apparatus 302 can correspond to multiple models (i.e., a first model based on the first cluster, a second model based on the second cluster and a third model based on the third cluster). Appreciably, a more accurate interpolation can be facilitated since a model's domain space is generally smaller as compared to the entire set of datasets contained in a database 304. Interpolation can, for example, be either in frequency domain or time-domain.

In one embodiment, the processing apparatus 302 can be configured to derive one or more datasets (e.g., BRIR/BRTF or HRIR/HRTF) from the database(s) 304 based one or more of the aforementioned multiple models. In another embodiment, the processing apparatus 302 can be configured to characterize each model (i.e., from the aforementioned multiple models) to derive/generate a response characteristic.

According to an embodiment of the disclosure, each of the datasets retrieved based on the cluster based processing strategy can be considered an intermediate processor dataset. In one example, based on one or more of the aforementioned multiple models (e.g., first to third models), the processing apparatus 302 can be configured to identify and retrieve one or more corresponding datasets (e.g., one or more BRIRs).

In one specific example, based on the first model, the processing apparatus 302 can be configured to identify and retrieve a first BRIR and a second BRIR. Based on the second model, the processing apparatus 302 can be configured to identify and retrieve a third BRIR. Based on the third model, the processing apparatus 302 can be configured to identify and retrieve a fourth BRIR and a fifth BRIR. The first to fifth BRIRs can be considered to correspond to a first intermediate processor dataset, a second intermediate processor dataset, a third intermediate processor dataset, a fourth intermediate processor dataset and a fifth intermediate processor dataset respectively.

In another specific example, based on the first model, the processing apparatus 302 can be configured to identify and retrieve a first BRIR and a second BRIR. Based on the second model, the processing apparatus 302 can be configured to identify and retrieve a third BRIR. The first to third BRIRs can be considered to correspond to a first intermediate processor dataset, a second intermediate processor dataset and a third intermediate processor dataset respectively.

In yet another specific example, based on the first model, the processing apparatus 302 can be configured to identify and retrieve a first BRIR. Based on the second model, the processing apparatus 302 can be configured to identify and retrieve a second BRIR. Based on the third model, the processing apparatus 302 can be configured to identify and retrieve a third BRIR. The first to third BRIRs can be considered to correspond to a first intermediate processor dataset, a second intermediate processor dataset and a third intermediate processor dataset respectively.

Earlier mentioned, the processing apparatus 302, in another embodiment, can be configured to characterize each model (i.e., from the aforementioned multiple models) to derive/generate a response characteristic. In one example, based on one or more of the aforementioned multiple models (e.g., first to third models), the processing apparatus 302 can be configured to derive/generate one or more corresponding response characteristics.

According to another embodiment of the disclosure, each of the response characteristics derived/generated based on the cluster based processing strategy can be considered an intermediate processor dataset. In one example, based on one or more of the aforementioned multiple models (e.g., first to third models), the processing apparatus 302 can be configured to derive/generate one or more corresponding response characteristics (e.g., a first response characteristic, a second response characteristic and a third response characteristic). The derived/generated response characteristic(s) can correspond to derived/generated intermediate processor dataset(s) (e.g., a first intermediate processor dataset, a second intermediate processor dataset and a third intermediate processor dataset). For example, the first to third response characteristics can correspond, respectively, to a first to third intermediate processor datasets.

The present disclosure contemplates that the processing apparatus 302 can be configured to characterize the model(s) by manner of one or both of static cluster characterization and dynamic cluster characterization. Moreover, each cluster can be associated with a centroid and a plurality of datasets (e.g., BRIRs/BRTFs or HRIRs/HRTFs).

In regard to static cluster characterization, datasets (e.g., BRIRs) and/or the centroid of a cluster can be considered. In one example, an average of the BRIRs in a cluster can be obtained to derive/generate a response characteristic. In another example, BRIR which is considered to be the nearest to the centroid can be identified to derive/generate a response characteristic. In yet another example, a weighted sum of all the BRIRs (where BRIRs closer to the centroid are weighted higher compared to those further from the centroid) can be obtained to derive/generate a response characteristic. In yet a further example, the datasets can be considered based on general statistical methods (e.g., a median based statistical method).

Appreciably, in this regard, based on static cluster characterization, each model can be associated with a response characteristic (e.g., in the form of a BRIR). For example, a first model can be associated with a first response characteristic (e.g., in the form of a first BRIR), a second model can be associated with a second response characteristic (e.g., in the form of a second BRIR) and a third model can be associated with a third response characteristic (e.g., in the form of a third BRIR).

In regard to dynamic cluster characterization, datasets and/or centroid of a cluster can be considered in combination with a new image captured (e.g., a sixth image in relation to a new sixth subject "F" in the context of the earlier example of five images in relation to a first subject "A", a second subject "B", a third subject "C", a fourth subject "D" and a fifth subject "E").

A dataset (e.g., BRIR) associated with a newly captured image (e.g., image of a new sixth subject "F") can be identified and retrieved (i.e., in analogous manner as discussed earlier) from the database(s) 304. Moreover, the newly captured image (i.e., the sixth image) can be compared with, for example, the first to fifth images. For example, biometric data associated with the sixth image can be compared with biometric data associated with corresponding biometric data associated with the first to fifth images. By manner of determining similarity/closeness between the sixth image and any one of, or any combination of, the first to fifth images, weight/contribution associated with the dataset associated with the sixth image can be determined.

Based on the weight/contribution of the dataset associated with the sixth image, a response characteristic can be determined in analogous manner as discussed earlier in respect of static cluster characterization.

For example, earlier mentioned in the context of static cluster characterization, the centroid can be used as a reference for determining a weighted sum of all the BRIRs (where BRIRs closer to the centroid are weighted higher compared to those further from the centroid) so as to derive/generate a response characteristic. In the case of dynamic cluster characterization, instead of the centroid, the weight/contribution of the dataset associated with the newly captured image (e.g., sixth image) can be used as reference.

In this regard, one or more intermediate processor datasets can be generated/derived based on the third processing strategy. The processing apparatus 302 can be configured, as will be discussed later in further detail, to further process the intermediate processor dataset(s) to generate/produce an output signal.

Based on the foregoing concerning the processing strategies, it is appreciable that a plurality of intermediate processor datasets can be derived/produced based on any one of the processing strategies or any combination of the processing strategies to produce at least one output signal. Earlier mentioned, output signal(s) can correspond to output data in the form of, for example, a customized audio response characteristic (e.g., audio related transfer function). These will be discussed in further detail, based on an exemplary context 500, with reference to FIG. 5 hereinafter.

Figure 5:
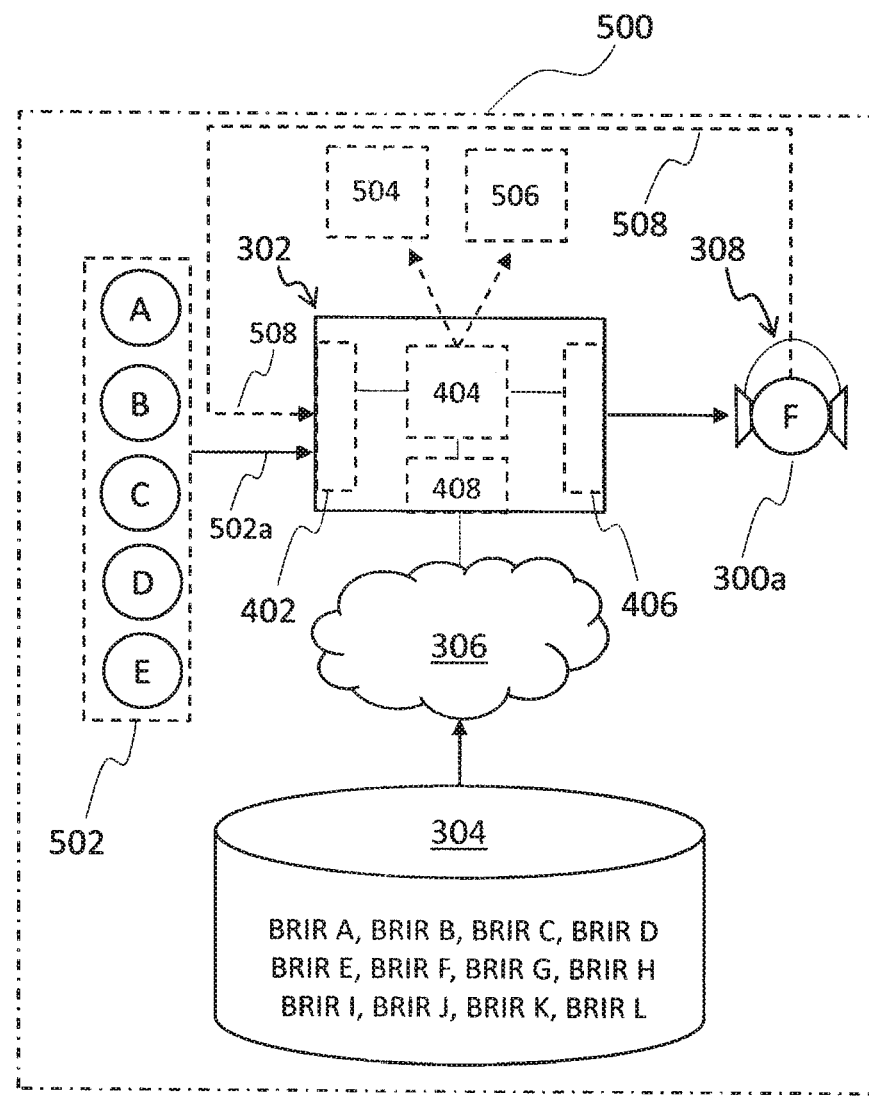
FIG. 5 shows an exemplary context in relation to the processing apparatus of FIG. 4 being configured to generate at least one output signal, according to an embodiment of the disclosure.

Referring to FIG. 5, an exemplary context 500 in relation to the processing apparatus 302 being configured to generate at least one output signal is shown, according to an embodiment of the disclosure.

Specifically in the exemplary context 500, the database 304 can be a BRIR based database which contains a plurality of BRIRs (i.e., BRIR A to BRIR L as shown in FIG. 5).

Moreover, the processing apparatus 302 can be configured based on a combination of the earlier discussed processing strategies. For example, the processing apparatus 302 can be configured by manner of training based on a combination of the earlier discussed second and third processing strategies to derive/produce a plurality of intermediate processor datasets, and combining the intermediate processor datasets based on the first processing strategy.

Additionally, a plurality of subjects 502 can be considered for the purpose of training the processing apparatus 302. For example, at least five subjects (i.e., subject "A" to subject "E") can be considered for the purpose of training the processing apparatus 302. Furthermore, the biometric data can relate to one or both of a first biometric data feature type such as pinna radius of each of the five subjects and a second biometric data feature type such as head radius of each of the five subjects.

More specifically, as indicated by arrow 502a, the processing apparatus 302 can be configured to one or both of capture data (i.e., capture image of each of the five subjects) and receive captured data (i.e., captured image of each of the five subjects) corresponding to a first image (i.e., of subject "A"), a second image (i.e., of subject "B"), a third image (i.e., of subject "C"), a fourth image (i.e., of subject "D") and a fifth image (i.e., of subject "E").

The first to fifth images can each be associated with a BRIR from the BRIR database 304. Specifically, the first image can be associated with a first BRIR (i.e., BRIR "A"). The second image can be associated with a second BRIR (i.e., BRIR "B"). The third image can be associated with a third BRIR (i.e., BRIR "C"). The fourth image can be associated with a fourth BRIR (i.e., BRIR "D"). The fifth image can be associated with a fifth BRIR (i.e., BRIR "E").

Furthermore, the processing apparatus 302 can be configured to extract biometric data from each of the first to fifth images. As mentioned, the extracted biometric data can include one or both of pinna radius and head radius. In this regard, the processing apparatus 302 can be configured to determine pinna radius and/or head radius of each subject (i.e., subjects "A" to "E").

In one embodiment, the first to fifth BRIR can be further processed by the processing apparatus 302 by manner of clustering. Clustering can be based on the extracted biometric data such as head radius. For example, the first to fifth BRIR can be subjected to K-means based clustering based on head radius of each of the subjects (i.e., subject "A" to subject "E") to derive a first cluster and a second cluster. Specifically, the first cluster can, for example, include the first BRIR (i.e., BRIR "A"), the second BRIR (i.e., BRIR "B") and the fifth BRIR (i.e., BRIR "E"). The second cluster can, for example, include the third BRIR (i.e., BRIR "C") and the fourth BRIR (i.e., BRIR "D").

Moreover, the processing apparatus 302 can be trained via a plurality of training options. The plurality of training options can include, for example, a first training option and a second training option.

The first training option can, for example, relate to training the processing apparatus 302 to be a first type recognizer based on the first biometric data feature type (e.g., pinna radius). Specifically, pinna radius extracted based on the first image (i.e., of subject "A") can be associated with the first BRIR (i.e., BRIR "A"), the pinna radius extracted based on the second image (i.e., of subject "B") can be associated with the second BRIR (i.e., BRIR "B"), the pinna radius extracted based on the third image (i.e., of subject "C") can be associated with the third BRIR (i.e., BRIR "C"), the pinna radius extracted based on the fourth image (i.e., of subject "D") can be associated with the fourth BRIR (i.e., BRIR "D") and the pinna radius extracted based on the fifth image (i.e., of subject "E") can be associated with the fifth BRIR (i.e., BRIR "E").

The processing apparatus 302 can be configured to store each of the above mentioned association between pinna radius and BRIR in the form of a reference table 504 (i.e., a table of reference data based on association between a biometric data feature type and a dataset). The reference table 504 can be stored in, for example, a memory portion (not shown) of the processing apparatus 302. The reference table 504 can be a basis for generating one or more intermediate processor datasets as will be discussed later in further detail.

The second training option can, for example, relate to training the processing apparatus 302 to be a second type recognizer based on the second biometric data feature type (e.g., head radius). Moreover, the second training option can be by manner of clustering based on the second biometric data feature type to derive one or more clusters 506 (e.g., a first cluster and/or a second cluster).

In an earlier example, head radius of each of the subjects (i.e., subject "A" to subject "E") can be subjected to clustering to derive a first cluster and a second cluster. The first cluster can, for example, include the first BRIR (i.e., BRIR "A"), the second BRIR (i.e., BRIR "B") and the fifth BRIR (i.e., BRIR "E"). The second cluster can, for example, include the third BRIR (i.e., BRIR "C") and the fourth BRIR (i.e., BRIR "D").

Moreover, the BRIRs of each of the first and second clusters can be subjected to averaging (i.e., the processing apparatus 302 can be configured to further process the clusters by manner of averaging) to derive/produce an intermediate processor dataset (e.g., a BRIR). Specifically, the first cluster can be further processed to derive/generate an intermediate processor dataset (e.g., a BRIR) and the second cluster can be further processed to derive/generate another intermediate processor dataset (e.g., another BRIR).

The cluster(s) 506 can, in one embodiment, be used for training the processing apparatus 302. For example, the first and second clusters can be used for training the processing apparatus 302.

Specifically, the processing apparatus 302 can, for example, be trained based on the first and second clusters by manner of association between head radius (i.e., of a subject) and a cluster (i.e., the first cluster/the second cluster).

For example, head radius extracted based on the first image (i.e., of subject "A") can be associated with the first cluster, the head radius extracted based on the second image (i.e., of subject "B") can be associated with the first cluster, the head radius extracted based on the third image (i.e., of subject "C") can be associated with the second cluster, the head radius extracted based on the fourth image (i.e., of subject "D") can be associated with the second cluster and the head radius extracted based on the fifth image (i.e., of subject "E") can be associated with the first cluster.

Association between the cluster(s) 506 and the second biometric data feature type (e.g., head radius) can be stored in a memory portion (not shown) of the processing apparatus 302 in the form of a reference look-up analogous to the aforementioned reference table 504.

The processing apparatus 302 trained based on the second training option can be configured to generate one or more intermediate processor datasets as will be discussed later in further detail.

Earlier mentioned, the processing apparatus 302 can be configured by manner of training based on a combination of the earlier discussed second and third processing strategies to derive/produce a plurality of intermediate processor datasets.

Appreciably, the processing apparatus 302 can be configured based on a combination of the first and second training options. Further appreciably, the first training option can be considered to be based on the second processing strategy whereas the second training option can be considered to be based on a combination of the second processing strategy and the third processing strategy. In this manner, the processing apparatus 302 can be configured by manner of training based on a combination of the second and third processing strategies according to an embodiment of the disclosure.

Additionally it was mentioned earlier, the reference table 504 (i.e., in relation to the first training option) can be a basis for generating one or more intermediate processor datasets and the processing apparatus 302 trained based on the second training option can be configured to generate one or more intermediate processor datasets.

The processor apparatus 302 (which has been trained based on a combination of the first and second training options, according to an embodiment of the disclosure) can be configured to combine the intermediate processor datasets based on the first processing strategy to generate/produce at least one output signal. This will be discussed in the context of an output signal being generated in relation to a new subject "F" corresponding to the aforementioned person 300a mentioned in FIG. 3.

Captured data associated with the new subject "F" (i.e., person 300a) can be obtained (as indicated by dotted arrow 508). Specifically, biometric data of the new subject "F" can be obtained and the obtained biometric data can include a first biometric feature type (e.g., pinna radius) and a second biometric feature type (e.g., head radius).

The processing apparatus 302 can be configured to generate/produce a first set of intermediate processor dataset based on a first processing mode. Moreover, the processing apparatus 302 can be configured to generate/produce a second set of intermediate processor dataset based in a second processing mode.

Each of the first set and second set of intermediate processor dataset can include one or more intermediate processor datasets (e.g., one or more BRIRs). Moreover, the first processing mode can be based on the processing apparatus 302 operating as the aforementioned first type recognizer and the second processing mode can be based on the processing apparatus 302 operating as the aforementioned second type recognizer.

In the first processing mode, the biometric data of the new subject "F" can be further processed by the processing apparatus 302 by manner of data comparison. More specifically, the first biometric feature type (e.g., pinna radius) associated with the new subject "F" can be obtained and compared against/with the reference table 504 to determine/retrieve one or more BRIRs which can be considered to most closely match the, for example, pinna radius of the new subject "F".

In one example, data comparison can be based on a closest match based comparison with a predetermined tolerance. Specifically, the predetermined tolerance can be based on a difference of 1 cm. More specifically, a BRIR associated with a pinna radius in the reference table 504 which is less than 1 cm in difference to the pinna radius of the new subject "F" can be retrieved.

In a more specific example, based on comparison between the pinna radiuses of the new subject "F" and the subjects (i.e., subjects "A" to "E") recorded/stored in the reference table 504. A plurality of BRIRs (e.g., a BRIR associated with the pinna radius of subject "A", a BRIR associated with the pinna radius of subject "C" and a BRIR associated with the pinna radius of the subject "E") can be retrieved. The closest match (e.g., BRIR associated with the pinna radius of subject "E") can have a confidence level of 0.9 (with a confidence level of 1.0 being considered as the perfect match), the next closest match (e.g., BRIR associated with the pinna radius of subject "A") can have a confidence level of 0.8 and the subsequent closest match (e.g., BRIR associated with the pinna radius of subject "C") can have a confidence level of 0.6, and so on.

In this regard, the first set of intermediate processor dataset can, for example, include a first BRIR (e.g., BRIR I) associated with a confidence level of 0.9, a second BRIR (e.g., BRIR II) associated with a confidence level of 0.8 and a third BRIR (BRIR III) associated with a confidence level of 0.6.

In the second processing mode, the biometric data of the new subject "F" can be further processed by the processing apparatus 302 by manner of data comparison. More specifically, the second biometric feature type (e.g., head radius) associated with the new subject "F" can be obtained and compared against/with the aforementioned look-up reference to retrieve one or more cluster(s) 506. Each cluster 506 retrieved can be associated with a confidence level.

For example, the aforementioned first cluster and the aforementioned second cluster can be retrieved based on head radius of the new subject "F". The first cluster can be considered to be most closely matching and the second cluster to a much lesser extent. In this regard, the first cluster can be associated with a confidence level close to 1.0 (e.g., 0.9) whereas the second cluster can be associated with a confidence level which is further from 1.0 (e.g., 0.5).

Moreover, as mentioned earlier, the BRIRs of each of the first and second clusters can be subjected to averaging to derive/produce an intermediate processor dataset (e.g., a BRIR). Specifically, the first cluster can be further processed to derive/generate an intermediate processor dataset (e.g., a BRIR) and the second cluster can be further processed to derive/generate another intermediate processor dataset (e.g., another BRIR). The BRIR derived based on the first cluster can correspond to, for example, a first clustered BRIR. The BRIR derived based on the second cluster can correspond to, for example, a second clustered BRIR.

In this regard, the second set of intermediate processor dataset can, for example, include a first clustered BRIR associated with a confidence level of 0.9 and a second clustered BRIR associated with a confidence level of 0.5.

Earlier mentioned, the processor apparatus 302 can be configured to combine the intermediate processor datasets based on the first processing strategy.

Specifically, the first and second sets of intermediate processor dataset can be combined based on the first processing strategy.

In one embodiment, the first and second sets of intermediate processor dataset can be combined based on weighted sum to obtain an output signal.

More specifically, based on weighted sum, the output signal can, for example, be:

Output signal=0.9*BRIR *I*+0.8*BRIR *II*+0.6*BRIR *III*+0.9*first clustered BRIR+0.5*second clustered BRIR In another embodiment, the first and second sets of intermediate processor dataset can be combined based on weighted sum and the weighted sum is further subjected to a scale factor (i.e., "N") to obtain an output signal. For example, Output signal=(0.9*BRIR *I*+0.8*BRIR *II*+0.6*BRIR *III*+0.9*first clustered BRIR+0.5*second clustered BRIR)*N(e.g., N=⅕,given that there are 5BRIRs in the weighted sum).

Figure 6:
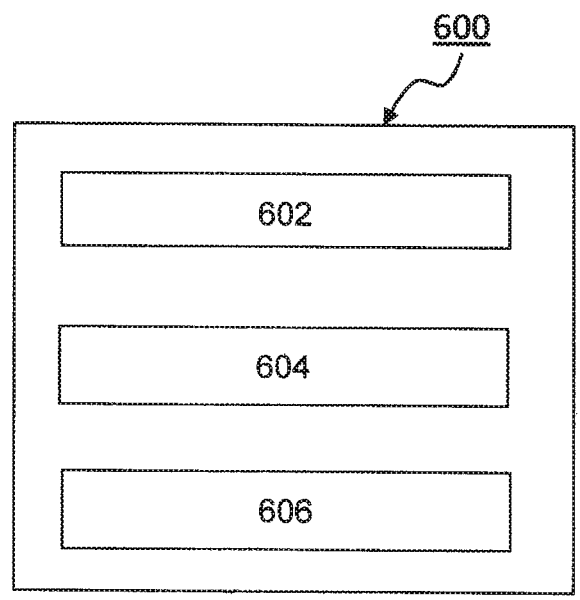
FIG. 6 shows a processing method in association with the system of FIG. 3, according to an embodiment of the disclosure.

FIG. 6 shows a processing method 600 in association with the system 300 of FIG. 3, according to an embodiment of the disclosure.

The processing method 600 can include an extraction step 602, a generating step 604 and an output step 606.

At the extraction step 602, at least one image (e.g., a photograph) of a subject (e.g., the aforementioned person 300a/subject "F") can be captured. The captured image can, for example, correspond to an image of the head of the subject, an image of the upper torso of the subject or an image of an ear of the subject. The captured image(s) can be received and processed at the processing apparatus 302 to generate at least one input signal.

The input signal(s) can correspond to biometric data associated with the subject. Biometric data can be extracted (e.g., by the processing apparatus 302) from the captured image(s). In one embodiment, the biometric data can include a first biometric feature type (e.g., pinna radius) and a second biometric feature type (e.g., head radius).

At the generating step 604, the generated input signal(s) can be further processed by the processing apparatus 302 based on at least one database signal. The database signal(s) can be communicated from at least one database 304 to the processing apparatus 302. Specifically, the generated input signal(s) can be further processed based on the database signal(s) to generate a plurality of intermediate processor datasets.

In one embodiment, the processing apparatus 302 can be trained to operate as at least one type of recognizer (e.g., a first type recognizer or a second type recognizer) of a plurality of recognizers. In another embodiment, the processing apparatus is capable of being trained to operate as a multi-recognizer (i.e., a plurality of recognizers) corresponding to at least a first type recognizer and a second type recognizer.

Earlier mentioned, the processing apparatus 302 can be operated as the first type recognizer in a manner so as to generate a first set of intermediate processor dataset based on the first biometric feature type (e.g., pinna radius). Additionally, the processing apparatus 302 can be operated as the second type recognizer to generate a second set of intermediate processor dataset based on the second biometric feature type (e.g., head radius).

At the output step 606, the intermediate processor datasets can be combined. Specifically, the processing apparatus 302 can be configured to combine the intermediate processor datasets in a manner so as to produce at least one output signal.

In one embodiment, the intermediate processor datasets can include the aforementioned first set of intermediate processor dataset and the aforementioned second set of intermediate processor dataset. Each of the first and second sets of intermediate processor dataset can include one or more intermediate processor datasets. The first and second sets of intermediate processor dataset can be combined by the processing apparatus 302 by manner of weighted sum.

In another embodiment, the database(s) 304 can include a plurality of datasets. The plurality of datasets can be communicated in the form of corresponding plurality of database signals from the database(s) 304 to the processing apparatus 302. Earlier mentioned, the plurality of datasets of the database(s) 304 can be grouped into a plurality of cluster groups (i.e., corresponding to the aforementioned clusters 506). Each cluster group can correspond to a cluster (e.g., the aforementioned first cluster or the aforementioned second cluster) which can include at least one dataset.

Additionally, the processing apparatus 302 can be trained by manner of association in which a biometric feature type (e.g., head radius) retrieved from one or more captured images (e.g., from subjects "A" to "E") can be associated with a cluster (e.g., the aforementioned first cluster or the aforementioned second cluster).

In this regard, the processing apparatus 302 can, in one embodiment, be trained to operate as a multi-recognizer (e.g., a first type recognizer and a second type recognizer) in which one of the recognizers (e.g., the first type recognizer) can generate a first set of intermediate processor dataset based on the first biometric feature type (e.g., pinna radius) and another one of the recognizers (e.g., the second type recognizer) can generate a second set of intermediate processor dataset based on the second biometric feature type (e.g., head radius) which is associated with a cluster (e.g., the first cluster/the second cluster).

Earlier mentioned, the first and second sets of intermediate processor dataset can be combined by the processing apparatus 302 by manner of weighted sum.

Appreciably, the output signal(s) can correspond to at least one audio response characteristic unique to the subject. Moreover, the output signal(s) can be applied to input audio signals (e.g., at the audio device 308 worn by the subject) to generate output audio signals audibly perceivable by the subject so as to provide the subject with customized audio experience.

More specifically, as mentioned earlier, in one embodiment, the audio device 308 can include an audio source (not shown), an audio processor (not shown) and a pair of speaker drivers (not shown). The audio source can be coupled to the audio processor. The audio processor can be coupled to the pair of speaker drivers.

In this regard, the audio processor can be configured based on the output signal(s). Input audio signals generated and communicated from the audio source to the audio processor can be processed by the audio processor based on the output signal(s) to generate/produce output audio signals. Generated output audio signals can be communicated from the audio processor to the pair of speaker drivers. The subject, wearing the audio device 308, can audibly perceive the output audio signals via the pair of speaker drivers.

It should be further appreciated by the person skilled in the art that variations and combinations of features described above, not being alternatives or substitutes, may be combined to form yet further embodiments.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

In one example, the aforementioned clusters 506 can be further processed by the processing apparatus 302 to derive a cluster pyramid have a top level and a plurality of lower levels (e.g., a first lower level following the top level and, optionally, a second lower level following the first lower level).

The top level may be associated with a feature which can be a form of preliminary partition of domain space. For example, spectral magnitude can be a feature for preliminary matching so as to select a cluster out of, for example, four clusters at the top level.

Based on the selected cluster, a different feature (e.g. spectral peak/notch) can be used for secondary matching at the first lower level. For example, the selected cluster can be subjected to further matching (i.e., within the selected cluster based on spectral peak/notch) to produce/generate a refined cluster. The refined cluster may be subjected to yet further matching (in analogous manner per the first lower level) based on yet another feature at the second lower level to produce/generate a yet further refined cluster.

Method for Generating Customized Spatial Audio with Head Tracking

The HRTF of a person is unique mainly due to his unique ear, head, shoulder and torso. A generic HRTF, usually created by taking an "average" head, may not match the user's HRTF and result in elevation error, front-back confusion, and poor externalization. The best results in providing spatial audio are achieved by providing dense HRTF databases customized to the listener. This is important to the objective of providing accurate filtering, i.e., that the filter coefficients chosen provide the selected listener with an accurate perception that the sound is coming from the selected direction. Of course, generating a customized database of HRTF's with many data points requires more memory. Typically, an HRTF database will provide HRTF pairs for data points spaced no more than 15 degrees apart in azimuth and 15 degrees in elevation. These measurements are taken ideally to generate a full spherical grid around the listener. Preferably, and in order to provide even more accuracy in the HRTF filters, the data points are located as close as 3 degrees to each other. This of course generates a huge spherical HRTF grid that requires considerable memory storage. Moreover, measuring the HRTF of a person is a tedious and laborious process requiring a quiet room and the user to sit very still over a long period of time. The user may feel fatigue due to the long HRTF measurement process, and unable to keep still, resulting in less than ideal measurement. The HRTF is no longer accurate even if the user moved her head by a mere centimeter during the measurement. Insofar as the actual HRTF capture process, typically a loudspeaker is rotated around the user's head to correspond to a regular and typically dense spherical grid, and the whole process may take hours. The output of the measurement process is a HRTF map, which is list of HRTF indexed by (azimuth, elevation). To appreciate the measurement time involved and by way of example, the KEMAR HRTF database from MIT uses a measurement grid with azimuth increments of 5 degrees. Also, the CIPIC HRTF database from UC Davis uses a measurement grid with azimuth increments of 5.625 degrees. Relative to these even the commonly used IRCAM dataset using spacings of 15 degrees, though somewhat coarse, still takes considerable time for capturing a full spherical grid of data points, e.g. an HRTF map.

Given these drawbacks, it is desirable to shorten the measurement process while still providing acceptable accuracy.

In use, given a head pose (azimuth, elevation), conventional methods typically use the azimuth and elevation parameters as indices to "look up" in an a HRTF map or grid the proper HRTF and use the "nearest" HRTF, or an interpolation of surrounding HRTFs.

A straightforward interpolation in the time domain is the easiest approach, but it doesn't work very well. This is because interpolation of the time domain response can result in destructive interference if the neighboring IRs used for the interpolation are out of phase. Several methods have been proposed to avoid this problem. One example is to apply time warping so that the IRs become time aligned before interpolating. However, this is a complicated procedure because the interpolated IR has to be modified to take into account the time warping.

Due to the above issues, in preferred embodiments we use frequency-domain interpolation which provides good results even when the angle between the HRTFs is large. The present invention provides embodiments for interpolating in the frequency domain. In more detail, one method involves interpolating the magnitudes and phases of the HRTF. Performing interpolation in the frequency domain requires circuitry such as an FFT to convert to the frequency domain and an inverse FFT to convert back to the time domain. These are known to those of skill in the art and thus further explanation as to details in conversion blocks is believed unnecessary here.

The number of data points (grid points) used for the interpolation depends on a number of factors. These factors include the grid spacing (uniform where the spacing is constant over the whole grid, or non-uniform), and the location where the interpolated point lies relative to the grid points. Depending on the scenario, optimum results are typically achieved in embodiments using 2 or 3 points, although in some embodiments of the 4 points are used.

In various embodiments of the invention different interpolation methods are selected based largely on the coordinates of the interpolated point relative to the measured points. In a first embodiment adjacent linear interpolation is performed. This is the simplest method for interpolating the HRIRs. In this case the target angle is interpolated from two neighboring points. This method can be used when interpolating between points on the same plane (for example, azimuth angles with a fixed elevation, or elevation angles with a fixed elevation), i.e. when the interpolated point lies on one of the grid lines.

In another embodiment, bilinear interpolation is selected. This is an extension of linear interpolation, and can be used when the interpolated point lies between the grid lines. For a given target location, the interpolated HRIR is approximated as a weighted sum of HRIRs associated with the four nearest points. These points form a square or rectangle around the target location.

In yet another embodiment, spherical triangular interpolation is selected. This is really a modified version of bilinear interpolation that is able to work with non-uniform measurement grids i.e. when the nearest four points do not form a square or rectangle. In this case the three nearest points are chosen that form a triangle around the target location. As with the bilinear interpolation method, the interpolated IR is approximated as a weighted sum of HRTFs associated with the nearest points. In this case, however, the interpolation formula is more complicated.

In summary, the adjacent linear interpolation embodiment uses 2 HRIRs for interpolation, bilinear interpolation uses 4 points for the interpolation, and spherical triangular interpolation uses 3 points for the interpolation. Whichever method is used depends on the coordinates of the point being interpolated and whether the grid spacing is uniform or not.

Frequency domain interpolation allows us to use coarser intervals (e.g. 30-60 degrees instead of say 5 degrees), which significantly reduce the number of measurements needed to cover a spherical map or grid. In other words, we perform a sparser sampling of the sphere surrounding the listener's head. With reduced number of loudspeaker position, the capturing time is significantly reduced. This reduces the demand placed on user to keep still (which improves HRTF quality), and only require the room to be conducive over a shorter period of time.

In other embodiments, reduction in HRTF measurements is provided by capturing HRTFs in a non-regular grid. Not all head poses are equally important. For example, the frontal 60 degrees cone may be deemed more important in certain use-cases. The grid may be denser in that cone, while rear and bottom quadrants may have sparser grids.

In yet another embodiment we achieve efficiencies by using multiple speakers. Current methods such as IRCAM typically use one loudspeaker mounted on movable arm (& a rotating chair) to span the spherical grid. In this embodiment, we setup multiple speakers, and measure multiple HRTFs simultaneously and map them to a spherical grid, further reducing the time taken for measurements. In other words, for a speaker set up with 5 speakers around the listener (equipped with 2 in-ear microphones) we sequentially activate each of the 5 speakers, resulting in 5 readings for each position the listener takes relative to the speakers. Further still, reduction in HRTF capture measurements can be achieved with all of the above-mentioned techniques by recognizing symmetry. That is, if we assume that the room and user's pinna, head, and torso are symmetrical, we only need to measure the HRTF on half the sphere, and mirror the HRTF to the other half.

Figure 12:
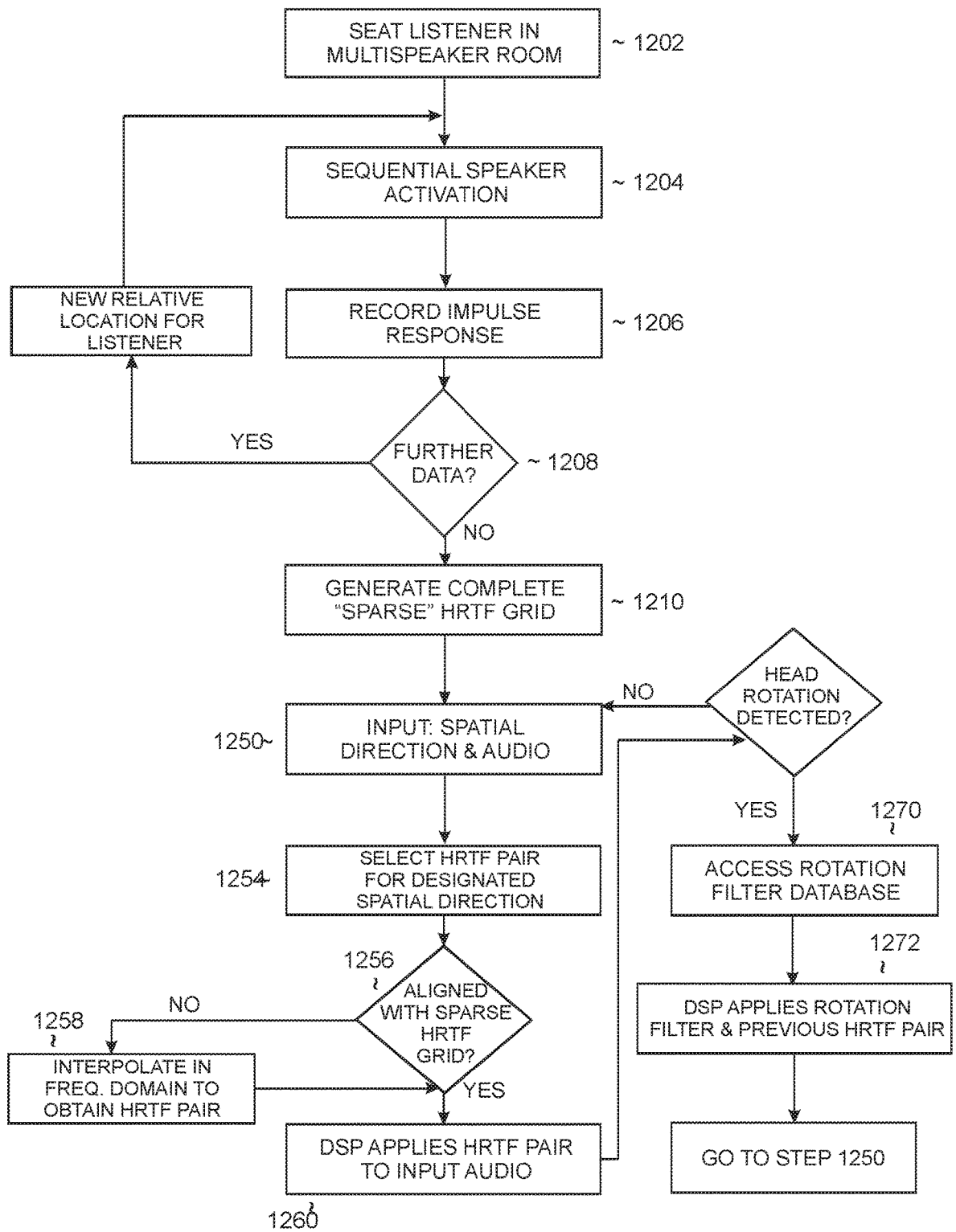
FIG. 12 is a flowchart reflecting the generation of a sparse HRTF grid and head tracking modifications applied to the selected HRTF pair in accordance with embodiments of the present invention.

FIG. 12 is a flowchart reflecting the generation of a sparse HRTF grid and headtracking modifications applied to the selected HRTF pair in accordance with embodiments of the present invention. Initially in step 1202 the listener is seated in a multi speaker room for generation of a customized HRTF database. Next in step 1204, the speakers are sequentially activated. In step 1206, the resulting impulse response is recorded from the in-ear microphones placed on the listener.

If further data points are required the process repeats itself with new relative locations established by moving the listener's head or chair. If no further data is required in decision tree 1208, the complete sparse HRTF grid is generated in step 1210 and stored. Use of the customized HRTF database commences with the input (step 1250) of a spatial direction and audio to a DSP processor preferably. Next, in step 1254, the process for selecting an HRTF pair for the desired spatial direction that was input commences. In step 1256, the decision tree determines whether the spatial direction is aligned with the sparse grid. If it does not line up precisely, a more accurate HRTF pair is generated by interpolation in step 1258, preferably in the frequency domain. In step 1260 the DSP applies the resulting HRTF pair (either from the sparse database or from interpolation) to the input audio signal. If no head rotation is detected in step 1266, the process returns to step 1250 for further input data. If head rotation is detected, in step 1270 the DSP accesses the rotation filter database as previously generated and described. In step 1272, the DSP applies the rotation filters selected, i.e., those corresponding to the detected azimuth and elevation parameters from the head tracking device. These are convolved with the originally selected or developed HRTF and the input audio signal. Once the HRTF is so modified, the process returns to step 1250 for processing of further input data.

Figure 7A:
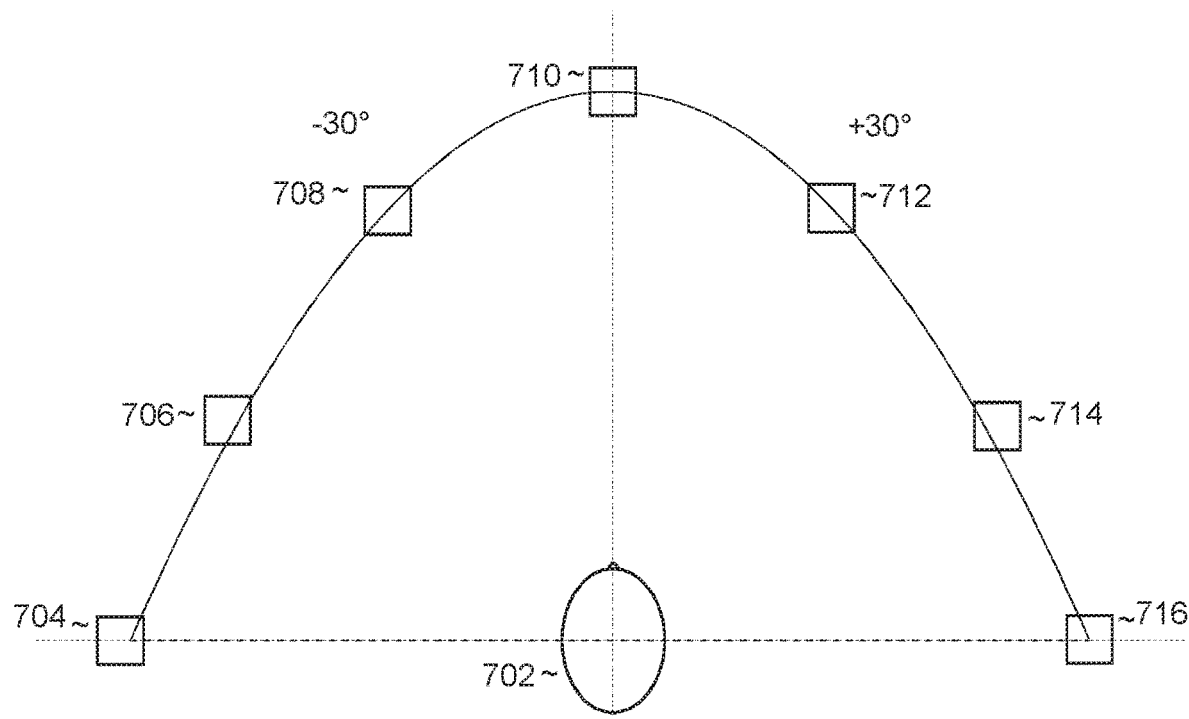
FIG. 7A is a diagram illustrating various speaker locations in azimuth around a listener's head as required conventionally for generating a BRIR database.

FIG. 7A is a diagram illustrating various speaker locations in azimuth around a listener's head as required conventionally for generating a BRIR database. Ideally, the speaker positions 704, 706, 708, 710, 712, 714, and 716 in azimuth around the listener 702 are 3 degrees apart for maximum accuracy. Similarly, the speaker locations 722, 724, 726, 728, and 730 would ideally reflect angular inclination and declination of 3 degrees from the nearest respective speaker position in elevation. Using the techniques of the present invention, comparable accuracies can be achieved with a "sparse" HRTF grid where the adjacent speaker positions may be in the 30 to 60 degrees range.

Figure 7B:
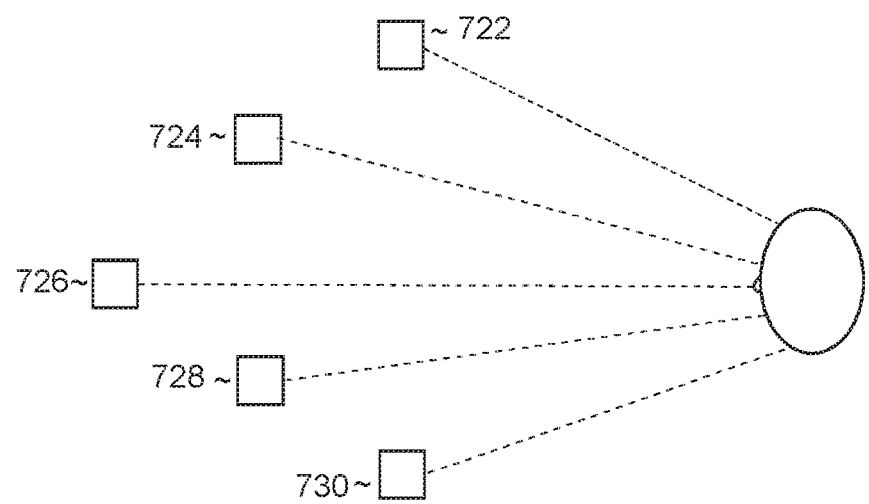
FIG. 7B is a graphical representation illustrating various speaker locations in elevation required conventionally for generating a BRIR database.

FIG. 7B is a graphical representation illustrating various speaker locations in elevation required conventionally for generating a BRIR database.

Figure 8:
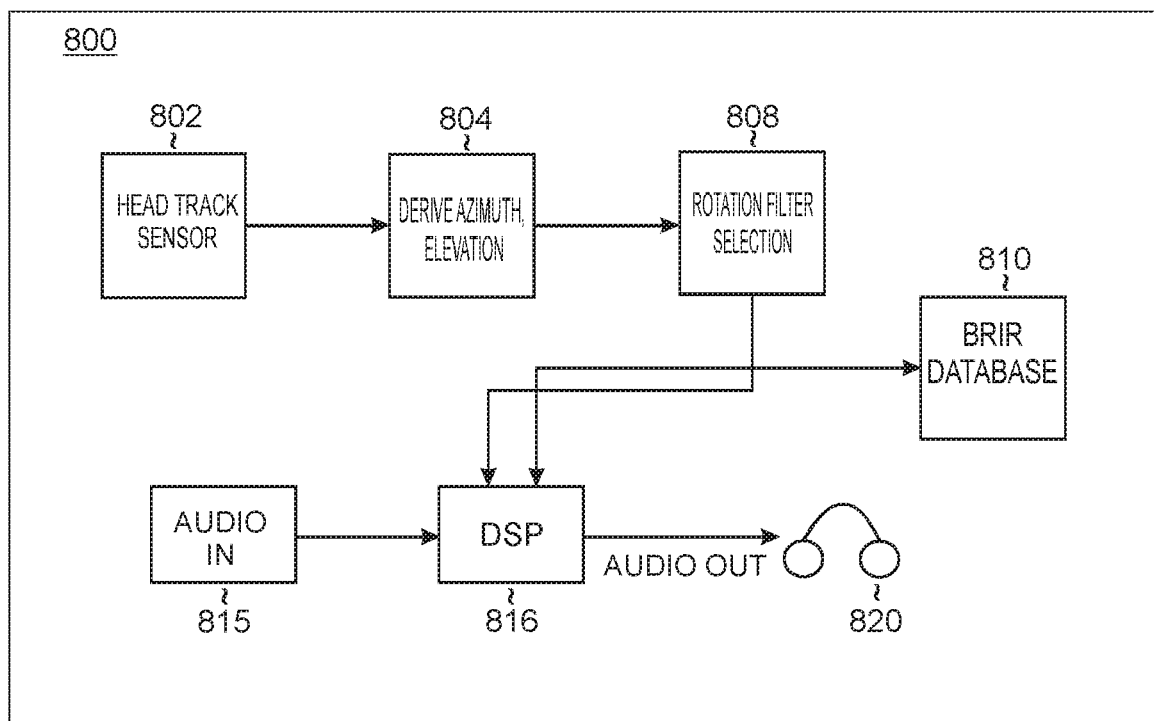
FIG. 8 is a diagram illustrating headphone circuitry having head tracking features in accordance with one embodiment of the present invention.

FIG. 8 is a diagram illustrating headphone circuitry having head tracking features in accordance with one embodiment of the present invention. In the system 800, a head tracking sensor 802 is coupled to the listener's head to measure changes in the user's head orientation. The output from this sensor is sued to generate azimuth and elevation information in azimuth block 804. The derived azimuth and elevation information is then transmitted to a rotation filter database 808. The DSP processor 816 uses the information in BRIR database 810 preferably storing customized HRTFs for the listener and the rotation filter selection corresponding to the elevation and azimuth parameters to process (filter) the input audio 815 to generate binaural audio signals to the headphone transducers 820.

Figure 9:
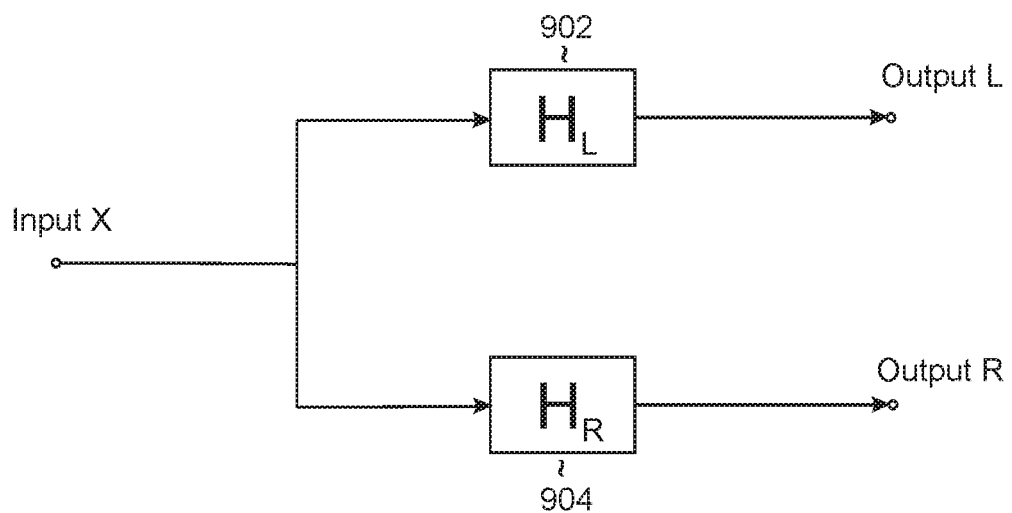
FIG. 9 is a diagram illustrating processing for a single virtual speaker for a specified location in accordance with one embodiment of the present invention.

FIG. 9 illustrates one embodiment of the invention. By using a single set of BRIRs (or alternatively a reduced set of BRIRs) instead of a set for each different orientation of the head the current invention in various embodiments substantially avoids the problems described above, while maintaining realism. This single or reduced set of BRIRs is combined with a set of 'rotation filters' which convert the BRIR for a position to the BRIR for a different position. These rotation filters can be very short, thus saving on memory and processing cost. This diagram shows the processing for a single virtual speaker in a specific position relative to the head. In the description that follows we derive the transfer functions that we alternatively call rotation filters for converting the BRIR for an initial position to that for a second position. These rotation filters enable us to replace a database with complex filters (BRIRs for each possible position of the head) with shorter and simpler filters.

We then express the transfer functions $H_L$ and $H_R$ as a product of two transfer functions:

$$H_L = H_{AL} \cdot H_{TL}$$

$$H_R = H_{AR} \cdot H_{TR} \quad (1)$$

$H_{AL}$ and $H_{AR}$ are the anechoic transfer functions. They are the result of measurement of the transfer function from the speaker position to the ear in an anechoic chamber, and are typically called HRTFs. $H_{TL}$ and $H_{TR}$ are essentially the room reflections—this is what is left if the HRTF is removed.

Now assume that we have two head-relative speaker positions. Position zero is the position of one of the speakers when the head is looking straight forward. In this case the head-relative position of the speaker is the same as the absolute position. Position 1 is the head-relative position of the same speaker when the head is moved in some way, and thus this head-relative position is no longer the same as the absolute position. The transfer functions for these two positions are:

$$H_L^0 = H_{AL}^0 \cdot H_{TL}^0$$

$$H_R^0 = H_{AR}^0 \cdot H_{TR}^0$$

and $$H_L^1 = H_{AL}^1 \cdot H_{TL}^1$$

$$H_R^1 = H_{AR}^1 \cdot H_{TR}^1 \quad (2)$$

We need a pair of filters $H_{DL}$ and $H_{DR}$ (the rotation filters) which compensate for the difference in position. Thus:

$$H_L^1 = H_L^0 \cdot H_{DL}$$

and $$H_R^1 = H_R^0 \cdot H_{DR} \quad (3)$$

Substituting (2) into (3) we get:

$$H_{AL}^1 \cdot H_{TL}^1 = H_{AL}^0 \cdot H_{TL}^0 \cdot H_{DL}$$

and $$H_{AR}^1 \cdot H_{TR}^1 = H_{AR}^0 \cdot H_{TR}^0 \cdot H_{DR} \quad (4)$$

Now we assume that the reflections are the same irrespective of the head-relative position. Although this assumption is not entirely true, it is near enough to the truth for the results to be convincing. Thus:

$$H_{TL}^1 = H_{TL}^0 \cdot H_{TL}$$

and $$H_{TR}^1 = H_{TR}^0 \cdot H_{TR} \quad (5)$$

Substituting (5) into (4) we get:

$$H_{AL}^1 \cdot H_{TL} = H_{AL}^0 \cdot H_{TL} \cdot H_{DL}$$

and $$H_{AR}^1 \cdot H_{TR} = H_{AR}^0 \cdot H_{TR} \cdot H_{DR} \quad (6)$$

This enables us to cancel $H_{TL}$ and $H_{TR}$ from both sides of these equations and rearrange to yield:

$$H_{DL} = \frac{H_{AL}^1}{H_{AL}^0} \quad (7)$$

and $$H_{DR} = \frac{H_{AR}^1}{H_{AR}^0}$$

Thus, the transfer function of the filter we need is the HRTF for position zero (the absolute speaker position) divided by the HRTF for position 1 (the current head-relative speaker position).

Because HRTFs are anechoic, they contain no reverberation and can be accurately conveyed using short filters. Thus, the rotation filter can be short too. Experimentation has shown that an FIR filter with reduced number of taps to accommodate a shorter impulse response can be used. This offers considerable savings in the complexity of the FIR filters. For example, in the sample discussion on page 2 for sampling at 48 khz and with a 200 ms long impulse response 19,200 coefficients would be required for the conventional case. When the orientation of the head changes, the filter is changed and the filter coefficients must be updated. To avoid audio artifacts such as output signal discontinuities the transition between filters is handled directly by cross-fading the filter coefficients over a number of samples while processing is taking place, and thus the processing cost is only slightly increased when the head orientation changes in this embodiment.

Interaural Time Delay

The filters $H_L$ and $H_R$ shown in FIG. 9 may be expressed as the product of a time delay I and a zero-delay filter F:

$$H_L = F_L \cdot I_L$$

and $$H_R = F_R \cdot I_R$$

$I_L$ and $I_R$ are the interaural time delay (ITD) and arise because the sound from a source anywhere around the head other than on the sagittal plane will arrive at one ear before it arrives at the other. Thus, it will always be the case that at least one of them will be zero, and it will usually be the case that one is zero and the other positive. In the headtracking situation the ITD needs to change as the head moves. In a given room, ITD is primarily a function of azimuth and head width. A normal head width is usually referred to as the interaural distance (the distance between the ears) and is usually assumed to be 0.175 m. When I is positive this corresponds to a positive $I_R$ and zero $I_L$, and vice-versa when I is negative.

Figure 10:
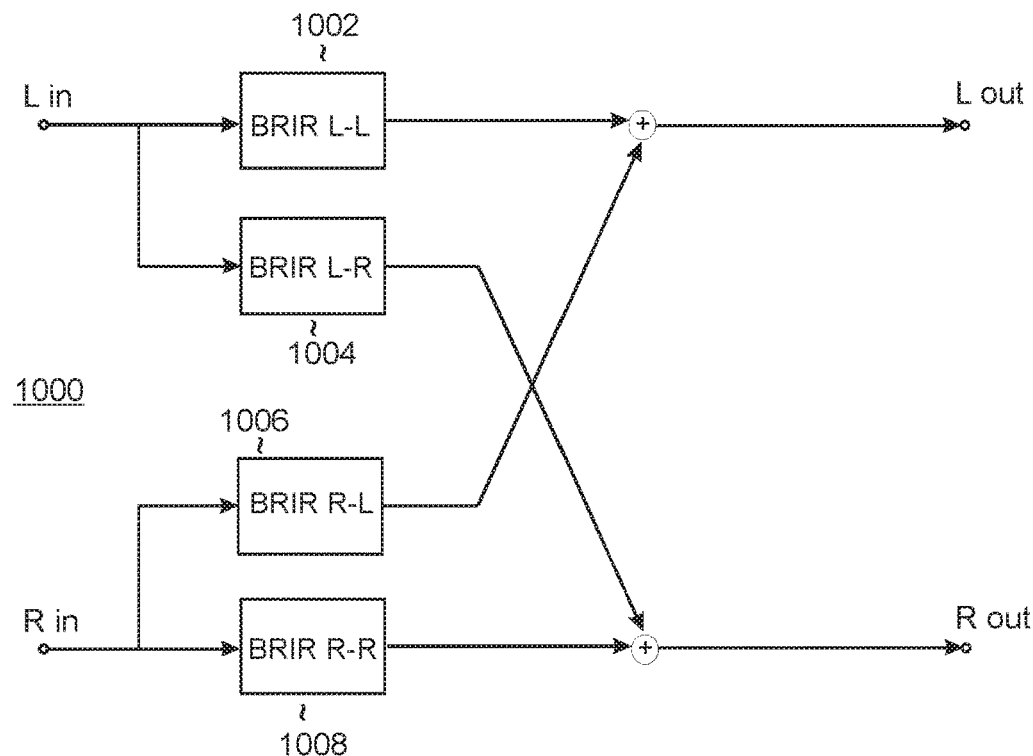
FIG. 10 is a diagram illustrating a conventional system for processing a stereo input signal without head tracking.

FIG. 10 shows the processing without head tracking for a stereo input according to conventional methods. Here the ITDs are included in the BRIR filters 1002, 1004, 1006, and 1008.

Figure 11:
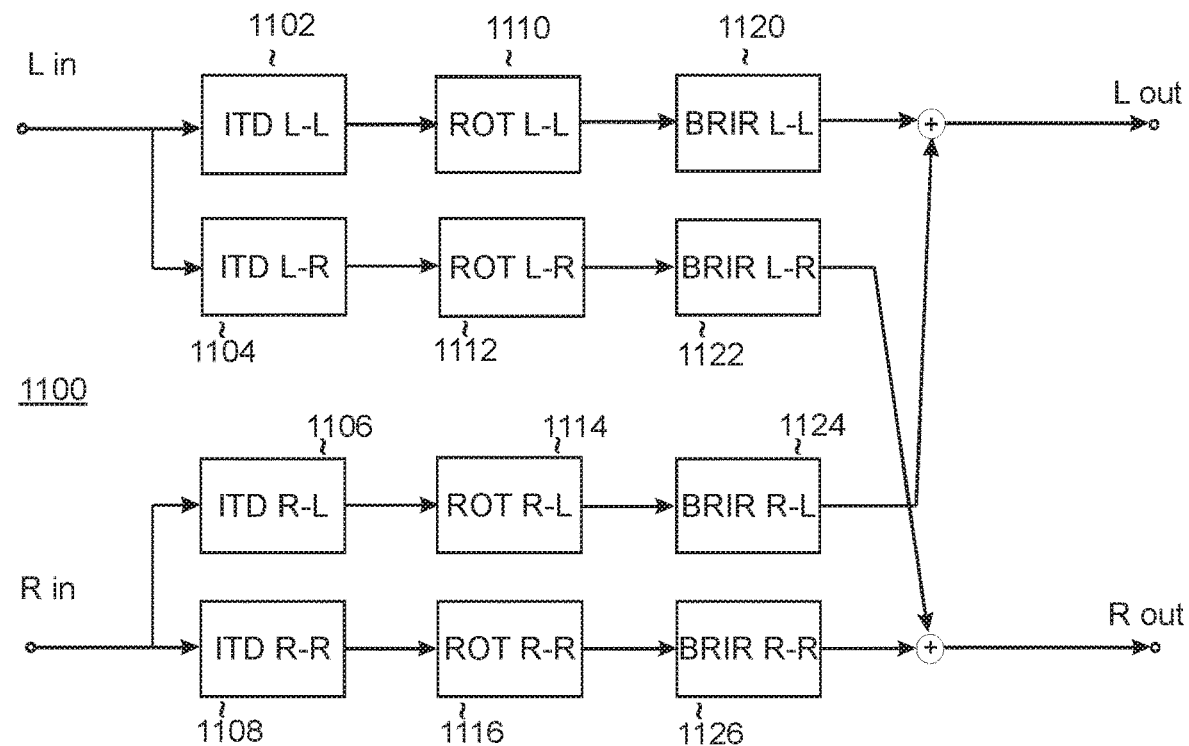
FIG. 11 is a diagram illustrating a stereo input with head tracking in accordance with one embodiment of the present invention.

FIG. 11 shows the processing with head tracking included in accordance with one embodiment of the present invention.

In this diagram:
  The blocks labelled ITD . . . are the ITDs (i.e., 1102, 1104, 1106, and 1108)
  The blocks labeled ROT (i.e., 1110, 1112, 1114, and 1116) are the time-domain FIR rotation filters, and
  The blocks labeled BRIR (i.e., 1120, 1122, 1124, and 1126) are the zero-delay versions of the impulse responses. These may be carried out using any convolution method.

For more channels, this processing may be extended with more blocks like that above, and the results mixed together to produce a single output pair.

Implementation Options

The rotation filters require much less storage than would be the case if multiple BRIR filters were used, as described in the 'Head Tracking' section above. If we use FIR filters with reduced numbers of taps, then the number of coefficients needed to be stored is considerably reduced, instead of over 700 million. If DSP memory is sufficient, then this table of coefficients can be stored on it. However it may be necessary to use external memory, in which case the coefficients can be transferred from external memory to the DSP in response to the head orientation. In one non-limiting embodiment this is implemented over a relatively low-bandwidth interface such as I2C.

To save memory further, the rotation filters may be stored on a coarser grid, and interpolation may be done in real time. HRTFs are often recorded on a coarse grid. For instance the IRCAM HRTFs (see hrtf.ircam.fr) use a grid of only 187 points with 15 degree azimuth resolution, and a similar resolution for elevation. This means that the table of rotation filters needs storage for just under 120,000 coefficients. In one implementation, the rotation filters are stored at this resolution, and we interpolate them in real time.

As noted above, the efficiencies in using rotation filters can reduce both processing and memory demands. Two methods for reducing the size of the database are identified below. In the first method, given two BRIRs. After the division process, we can significantly truncate the resultant BRIR in time domain while preserving "realism". In our derivation above, we assumed that the reflections are the same irrespective of the head-relative position. Hence, the "tail" of the resultant BRIR contains mostly reflections and may be truncated away, resulting in a filter having a smaller number of taps.

The efficiencies from the second method include using shorter HRTF filters with large BRIRs and this sacrificing very little accuracy. BRIR's are usually thousands of samples, while HRTFs (without the room response) may be much less than a thousand (for example, perhaps in a common case 512 samples each). In one preferred embodiment, we employ a separate HRTF database to generate the rotation filters (by dividing two HRTFs as disclosed in equation 7). These rotation filter can then be applied to a single captured large (for example a 24,000 sample) BRIR, for example for a source located at −30 degrees as part of a conventional stereo speaker setup.

In general, the process has the following elements, which may all be carried out on the same processor, or some of which may be carried out on a microcontroller, and some on a digital signal processor:

a) Interfacing with the head tracking sensor and deriving head orientation information,
b) Converting the head orientation into a head-relative azimuth and elevation for each virtual speaker,
c) Converting each head-relative azimuth and elevation into a pair of rotation filters,
d) Transmitting the rotation filters to the DSP
e) Processing the audio using BRIR and rotation filters.

Ideally, the rotation filters would be matched to the BRIRs, which would be personalised to the user. So the same personalisation process, as applied to the BRIRs, could be applied to the rotation filters. However, as alluded to above, good results can still be obtained by using an unrelated database to derive the filters and thereby saving considerable time in capturing the BRIRs.

The proposed spatial audio system with head tracking is expected to provide several advantages. It can be used in Virtual Reality applications or generally any application that renders 3D spatial audio. In comparison with the prior art, the novelties and advantages of this proposed scheme can be summarized as follows:

The greatest economies from the embodiments of the present invention are achieved from the reduction in complexity of the filters. That is, the filter size is reduced substantially. For example, the size of each rotation filter is in hundreds of samples (typically <<1000 samples). In contrast, an HRTF (which includes room response) may be in the order of thousands (a 500 ms HRTF will require 500/1000*48000=24,000 samples, where sampling rate=48 KHz The corresponding reduction in required processing makes high-quality headtracking realisable on portable devices rather than just desktop computers.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for enhancing audio rendering by generating a customized Head Related Transfer Function (HRTF), the method comprising:
   generating a plurality of control points that is a visual guide to acquire a captured image of at least one ear of an individual using an image capturing device;
   overlaying the plurality of control points in real-time onto a display screen of the image capturing device that provides an indication of alignment to a user;
   obtaining a shape model conformed to the captured image of the at least one ear of the individual;
   iteratively changing the plurality of control points to match the obtained shape model with the captured image of the at least one ear of the individual;
   iteratively deforming the shape model in accordance with movement of the image capturing device;
   deforming the shape model such that the plurality of control points conform to the shape of the at least one ear of the individual;
   ceasing the iterative changes of the plurality of control points in real-time, in response to the shape model conforming to the captured image of the at least one ear of the individual;
   extracting image based geometrical properties of the at least one ear of the individual from the obtained shape model; and
   providing the image based geometrical properties of the at least one ear of the individual to a selection processor configured to select, based on the image based geometrical properties of the at least one ear of the individual, a customized HRTF dataset for the at least one ear of the individual from a plurality of HRTF datasets that have been determined for a plurality of individuals.

2. The method as recited in claim 1, further comprising scaling the image based geometrical properties of the at least one ear of the individual or eye separation of the individual.

3. The method as recited in claim 2, wherein the visual guide provides the indication of alignment to the user when the obtained shape model is within an acceptable tolerance.

4. The method of claim 1, further comprising:
   processing the captured image of the at least one ear of the individual to generate at least one image-related input signal;
   processing the at least one image-related input signal based on at least one database signal to generate a plurality of intermediate processor datasets; and
   combining the plurality of intermediate processor datasets to produce at least one output signal,
   wherein the at least one output signal corresponds to an audio response characteristic unique to the individual, and
   wherein the at least one output signal is capable of being applied to input audio signals to generate output audio signals audibly perceivable by the individual so as to provide the individual with customized audio experience.

5. The method as recited in claim 1, wherein the customized HRTF dataset from the plurality of HRTF datasets is selected based on matching most closely the extracted image based geometrical properties of the at least one ear of the individual to the corresponding image based geometrical properties associated with each of the HRTF datasets in the plurality.

6. The method as recited in claim 1, wherein multiple HRTF datasets are selected from the plurality of HRTF datasets by matching one or more of image based geometrical properties and the customized HRTF is generated by one of interpolation or perturbation relating to at least one of the multiple HRTF datasets, and wherein the image based geometrical properties comprise one or more of distances of control points, arcs of control points, angles of control points, geometric relationships of control points, a concha length, ear width, ear height, general physical dimensions of the ear, and a three dimensional representation of the ear.

7. A system for processing customized HRTFs comprising:
an image processing device configured for:
generating a plurality of control points that is a visual guide to acquire a captured image of at least one ear of an individual using an image capturing device;
overlaying the plurality of control points in real-time onto a display screen of the image capturing device that provides an indication of alignment to a user;
obtaining a shape model conformed to the captured image of the at least one ear of the individual;
iteratively changing the plurality of control points to match the obtained shape model with the captured image of the at least one ear of the individual;
iteratively deforming the shape model in accordance with movement of the image capturing device;
deforming the shape model such that the plurality of control points conform to the shape of the at least one ear of the individual;
ceasing the iterative changes of the plurality of control points in real-time, in response to the shape model conforming to the captured image of the at least one ear of the individual;
extracting image based geometrical properties of the at least one ear of the individual from the obtained shape model; and
providing the image based geometrical properties of the at least one ear of the individual to a selection processor configured to select, based on the image based geometrical properties of the at least one ear of the individual, a customized HRTF dataset for the at least one ear of the individual from a plurality of HRTF datasets that have been determined for a plurality of individuals.

8. The system as recited in claim 7, wherein the image processing device is further configured for scaling the image based geometrical properties of the at least one ear of the individual and wherein the visual guide provides the indication of alignment to the user when the obtained shape model is within an acceptable tolerance.

9. The system as recited in claim 8, wherein the customized HRTF dataset from the plurality of HRTF datasets is selected based on matching most closely the extracted image based geometrical properties of the at least one ear of the individual to the image based geometrical properties associated with each of the HRTF datasets in the plurality of HRTF datasets.

10. The system as recited in claim 8, wherein multiple HRTF datasets are selected from the plurality of HRTF datasets by matching one or more of image based geometrical properties and the customized HRTF is generated by one of interpolation or perturbation relating to at least one of the multiple HRTF datasets, and wherein the image based geometrical properties comprise one or more of distances of control points, arcs of control points, angles of control points, geometric relationships of control points, a concha length, ear width, ear height, general physical dimensions of the ear, and a three dimensional representation of the ear.

11. The system as recited in claim 7, wherein the image processing device is configurable to be communicable with at least one database containing at least one dataset corresponding to an audio response characteristic based on biometric data from at least one person, the at least one dataset from the database being communicable as corresponding at least one database signal to the image processing device,
wherein the image processing device is operable in at least one processing mode of a plurality of processing modes, each processing mode corresponding to a recognizer type,
wherein the image processing device is configurable to receive the captured image of the at least one ear of the individual and generate at least one image-related input signal based on the received captured image,
wherein the image processing device is configurable to process the at least one image-related input signal based on the at least one database signal to generate a plurality of intermediate processor datasets and to combine the plurality of intermediate processor datasets to generate at least one output signal, the at least one output signal corresponding to an audio response characteristic unique to the individual, and
wherein the at least one output signal is capable of being applied to input audio signals to generate output audio signals audibly perceivable by the individual so as to provide the individual with customized audio experience.

12. A system for generating customized HRTFs comprising:
an image processing device configured for acquiring a captured image of at least one ear of an individual and for processing a preliminary image that is a preliminary version of the captured image;
a device processor configured for:
generating a plurality of control points that is a visual guide to acquire a captured image of at least one ear of an individual using an image capturing device;
overlaying the plurality of control points in real-time onto a display screen of the image capturing device that provides an indication of alignment to a user;
obtaining to obtain a shape model conformed to the captured image of the at least one ear of the individual;
iteratively changing the plurality of control points are changed iteratively to match the obtained shape model with the captured image of the at least one ear of the individual;
iteratively deforming the shape model in accordance with movement of the image capturing device;
deforming the shape model such that the plurality of control points conform to the shape of the at least one ear of the individual;
ceasing the iterative changes of the plurality of control points in real-time, in response to the shape model conforming to the captured image of the at least one ear of the individual; and extracting image based geometrical properties of the at least one ear of the individual from the obtained shape model;

a selection processor for receiving the extracted image based geometrical properties of the at least one ear of the individual and configured to select, based on the image based geometrical properties of the at least one ear of the individual, a customized HRTF dataset for the at least one ear of the individual from a plurality of HRTF datasets that have been determined for a plurality of individuals wherein the device processor and the selection processor can be separate units or combined into one processor; and a memory accessible by the selection processor and including the plurality of HRTF datasets, wherein the plurality of HRTF datasets is indexed by image based geometrical properties corresponding to an ear represented by each HRTF dataset in the plurality of HRTF datasets.

13. The system as recited in claim 12, wherein the visual guide provides the indication of alignment to the user when the obtained shape model is within an acceptable tolerance.

14. The system as recited in claim 13, wherein the customized HRTF dataset from the plurality of HRTF datasets is selected based on matching most closely the extracted image based geometrical properties of the at least one ear of the individual to the corresponding image based geometrical properties associated with each of the HRTF datasets in the plurality of HRTF datasets.

15. The system as recited in claim 12, wherein multiple HRTF datasets are selected from the plurality of HRTF datasets by matching one or more of image based geometrical properties; and the customized HRTF is generated by one of interpolation or perturbation relating to at least one of the multiple HRTF datasets; and wherein the image based geometrical properties comprise one or more of distances of control points, arcs of control points, angles of control points, geometric relationships of control points, a concha length, ear width, ear height, general physical dimensions of the ear, and a three dimensional representation of the ear.

* * * * *

UNITED STATES PATENT AND TRADEMARK OFFICE
CERTIFICATE OF CORRECTION

PATENT NO. : 11,601,775 B2  
APPLICATION NO. : 17/037232  
DATED : March 7, 2023  
INVENTOR(S) : Teck Chee Lee and Desmond Hii Page 1 of 1

It is certified that error appears in the above-identified patent and that said Letters Patent is hereby corrected as shown below:

On the Title Page

On Page 2, Continuation of Related U.S. Application Data, please delete "and a continuation-in-part of application No. 15/969,767, filed as application No. PCT/SG2016/050621 on Dec. 28, 2016, now Pat. No. 10,225,682." and insert --which is a National Stage Entry of PCT/SG2016/050621 filed on Dec. 28, 2016, and a continuation-in-part of application No. 15/969,767, filed on May 2, 2018, now Pat. No. 10,225,682.--

In the Claims

Column 34, Line 53, In Claim 12, please delete "to obtain"

Column 34, Lines 55-56, In Claim 12, please delete "are changed iteratively"

Signed and Sealed this  
Twenty-seventh Day of June, 2023

Katherine Kelly Vidal  
*Director of the United States Patent and Trademark Office*